United States Patent
Alshin et al.

(10) Patent No.: US 10,602,188 B2
(45) Date of Patent: Mar. 24, 2020

(54) METHOD AND APPARATUS FOR ENCODING OR DECODING IMAGE USING SYNTAX SIGNALING FOR ADAPTIVE WEIGHT PREDICTION

(71) Applicant: SAMSUNG ELECTRONICS CO., LTD., Suwon-si (KR)

(72) Inventors: Alexander Alshin, Suwon-si (KR); Mikhail Mishurovskiy, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 164 days.

(21) Appl. No.: 15/575,717

(22) PCT Filed: Jun. 3, 2016

(86) PCT No.: PCT/KR2016/005908
§ 371 (c)(1),
(2) Date: Nov. 20, 2017

(87) PCT Pub. No.: WO2016/200100
PCT Pub. Date: Dec. 15, 2016

(65) Prior Publication Data
US 2018/0295385 A1 Oct. 11, 2018

Related U.S. Application Data

(60) Provisional application No. 62/173,647, filed on Jun. 10, 2015.

(51) Int. Cl.
*H04B 1/66* (2006.01)
*H04N 7/12* (2006.01)
(Continued)

(52) U.S. Cl.
CPC ........... *H04N 19/70* (2014.11); *H04N 19/109* (2014.11); *H04N 19/159* (2014.11);
(Continued)

(58) Field of Classification Search
CPC ....... H04N 19/15; H04N 19/70; H04N 19/159
See application file for complete search history.

(56) References Cited

U.S. PATENT DOCUMENTS

| 8,005,144 B2 | 8/2011 | Ji et al. |
| 8,995,526 B2 | 3/2015 | Karczewicz et al. |

(Continued)

FOREIGN PATENT DOCUMENTS

| EP | 1938616 | 4/2007 |
| KR | 10-2004-0008742 A | 1/2004 |

(Continued)

OTHER PUBLICATIONS

Richardson (The H.264 dvanced Video Compression Standard. Wiley), (Year: 2010).*

(Continued)

*Primary Examiner* — Fabio S Lima
(74) *Attorney, Agent, or Firm* — Sughrue Mion, PLLC

(57) ABSTRACT

Provided are image encoding and decoding methods and apparatuses using weighted bi-prediction. The image decoding method and apparatus according to one embodiment obtain one or more prefixes including a first counter value indicating the number of additional syntax elements subsequent to main syntax elements from a received bitstream, obtain the additional syntax elements including weight information and information about whether to perform weighted bi-prediction on prediction units separated for predicting a current block, based on the one or more prefixes, and generate a prediction block including a prediction value, based on the main syntax elements and the additional syntax elements.

13 Claims, 19 Drawing Sheets

(51) Int. Cl.
  *H04N 11/02* (2006.01)
  *H04N 11/04* (2006.01)
  *H04N 19/70* (2014.01)
  *H04N 19/176* (2014.01)
  *H04N 19/159* (2014.01)
  *H04N 19/577* (2014.01)
  *H04N 19/109* (2014.01)
  *H04N 19/44* (2014.01)
  *H04N 19/52* (2014.01)
  *H04N 19/182* (2014.01)
  *H04N 19/139* (2014.01)

(52) U.S. Cl.
  CPC ........... *H04N 19/176* (2014.11); *H04N 19/44* (2014.11); *H04N 19/52* (2014.11); *H04N 19/577* (2014.11); *H04N 19/139* (2014.11); *H04N 19/182* (2014.11)

(56) References Cited

U.S. PATENT DOCUMENTS

| | | | |
|---|---|---|---|
| 2011/0002388 A1* | 1/2011 | Karczewicz | H04N 19/51 375/240.15 |
| 2011/0007803 A1* | 1/2011 | Karczewicz | H04N 19/105 375/240.15 |
| 2011/0170610 A1 | 7/2011 | Min et al. | |
| 2011/0206123 A1* | 8/2011 | Panchal | H04N 19/70 375/240.15 |
| 2011/0249748 A1 | 10/2011 | Zan et al. | |
| 2011/0293006 A1 | 12/2011 | Guleryuz | |
| 2013/0003823 A1* | 1/2013 | Misra | H04N 19/129 375/240.02 |
| 2013/0336399 A1* | 12/2013 | Yu | H04N 19/70 375/240.14 |
| 2014/0003510 A1* | 1/2014 | Lu | H04N 19/52 375/240.12 |
| 2014/0072041 A1* | 3/2014 | Seregin | H04N 19/105 375/240.13 |
| 2014/0105299 A1* | 4/2014 | Chen | H04N 19/597 375/240.15 |
| 2015/0016501 A1* | 1/2015 | Guo | G06T 9/00 375/240.02 |
| 2015/0103925 A1* | 4/2015 | Chen | H04N 19/70 375/240.26 |
| 2015/0195577 A1* | 7/2015 | Hannuksela | H04N 19/46 375/240.25 |
| 2015/0264363 A1* | 9/2015 | Pu | H04N 19/186 375/240.02 |
| 2015/0304665 A1* | 10/2015 | Hannuksela | H04N 19/70 375/240.02 |
| 2015/0312588 A1* | 10/2015 | Yamamoto | H04N 19/105 375/240.15 |
| 2016/0100171 A1* | 4/2016 | Karczewicz | H04N 19/13 375/240.02 |
| 2016/0373745 A1* | 12/2016 | Joshi | H04N 19/119 |
| 2018/0295385 A1* | 10/2018 | Alshin | H04N 19/176 |
| 2019/0045214 A1* | 2/2019 | Ikai | H04N 19/573 |
| 2019/0141333 A1* | 5/2019 | Lee | H04N 19/124 |

FOREIGN PATENT DOCUMENTS

| | | |
|---|---|---|
| KR | 10-2007-0026317 A | 3/2007 |
| KR | 10-2012-0031515 A | 4/2012 |
| KR | 10-2015-0052259 A | 5/2015 |
| WO | 2007/047786 A2 | 4/2007 |
| WO | 2013/012479 A1 | 1/2013 |

OTHER PUBLICATIONS

Communication dated Mar. 1, 2018, issued by the European Patent Office in counterpart European application No. 16807740.2.

Kim, et al., "Motion Compensation Based on Implicit Block Segmentation", Oct. 12, 2008, 15th IEEE International Conference on Image Processing, XP031374536, 4 pages total.

Richardson, "Chapter 6: H.264/MPEG4 Part 10", Jan. 1, 2003, H.264 and MPEG-4 Video Compression, Video Coding for Next-generation Multimedia, XP055040647, 65 pages total.

Bordes, "Weighted Prediction", Jul. 18, 2011, 6th Meeting, Joint Collaborative Team on Video Coding (JCT-VC) of ITU-T SG16 WP3 and ISO/IEC JTC1/SC29/WG11, JCTVC-F265, XP030049248, 14 pages total.

International Search Report, issued by International Searching Authority in corresponding International Application No. PCT/KR2016/005908, dated Sep. 1, 2016, (PCT/ISA/210).

Written Opinion, issued by International Searching Authority in corresponding International Application No. PCT/KR2016/005908, dated Sep. 1, 2016, (PCT/ISA/237).

* cited by examiner

PREFIX 1   PREFIX 2

CODING UNIT (1010)

METHOD AND APPARATUS FOR ENCODING OR DECODING IMAGE USING SYNTAX SIGNALING FOR ADAPTIVE WEIGHT PREDICTION

TECHNICAL FIELD

The present invention relates to an image encoding and decoding method, and more particularly, to an image encoding and decoding method and apparatus using one or more prefixes and additional syntax elements added to a bitstream for performing weighted bi-prediction.

BACKGROUND ART

Recently, the demand for high-resolution and high-quality images has increased in various applications. However, as the resolution and quality of images become higher, the amount of information about the images also increases. Therefore, when image information is transmitted by using a medium such as an existing wired or wireless broadband line, or when image information is stored by using an existing storage medium, information transmission cost and information storage cost increase.

High-efficiency image compression technology may be used for effectively transmitting or storing and reproducing information of high-resolution and high-quality images.

In order to increase the efficiency of image compression, a method of predicting a current block by using information of neighboring blocks of the current block without directly transmitting information of the current block may be used.

As the prediction method, inter prediction and intra prediction may be used. In the inter prediction method, a pixel value of a current picture is predicted by referring to information of another picture. In the intra prediction method, a pixel value is predicted by using a correlation between pixels in the same picture. In the case of performing the inter prediction, it is possible to utilize information indicating a reference picture and information indicating a motion vector from neighboring blocks in an inter prediction mode so as to designate a portion to be used for prediction in another picture.

An encoding apparatus entropy-encodes image information including a prediction result and transmits the entropy-encoded image information as a bitstream, and a decoding apparatus entropy-decodes the received bitstream and reconstructs the image information.

The compression efficiency of image information may be increased through the entropy encoding and the entropy decoding.

DETAILED DESCRIPTION OF THE INVENTION

Technical Problem

A technical problem to be solved by the present invention is to improve encoding and decoding efficiency of an entire image by increasing accuracy of inter prediction by using syntax signaling for adaptive weighted prediction.

Technical Solution

An image decoding method according to an embodiment includes: obtaining one or more prefixes including a first counter value indicating a number of additional syntax elements subsequent to main syntax elements from a received bitstream; obtaining the additional syntax elements including weight information and information about whether to perform weighted bi-prediction on prediction units separated for predicting a current block, based on the one or more prefixes; and generating a prediction block including a prediction value, based on the main syntax elements and the additional syntax elements.

Also, in the image decoding method according to an embodiment, each of the additional syntax elements may include a set of two bins for indicating information about the weight information and the information about whether to perform the weighted bi-prediction.

Also, in the image decoding method according to an embodiment, the one or more prefixes may include a second counter value indicating a number of additional syntax elements including information indicating that the weighted bi-prediction is to be performed among the additional syntax elements.

Also, in the image decoding method according to an embodiment, the obtaining of the additional syntax elements may include: determining probability information of bins of the additional syntax elements based on the first counter value and the second counter value; and sequentially decoding the bins of the additional syntax elements based on the probability information.

Also, in the image decoding method according to an embodiment, the determining of the probability information may include: decrementing the second counter value according to sequential decoding of the bins of the additional syntax elements; and updating the probability information by using the first counter value and the decremented second counter value.

Also, in the image decoding method according to an embodiment, the generating of the prediction block may include: determining a first correspondence region of a first reference picture and a second correspondence region of a second reference picture, which are most similar to the current block, from a first motion vector and a second motion vector included in the main syntax elements; confirming whether to perform the weighted bi-prediction based on the first correspondence region and the second correspondence region; and performing a weighted bi-directional motion compensation of a block unit or a pixel unit on the current block by using the first motion vector, the second motion vector, and the weight information.

Also, in the image decoding method according to an embodiment, the confirming of whether to perform the weighted bi-prediction may include: performing no weighted bi-prediction when a difference value between a first correspondence pixel of the first reference picture and a second corresponding pixel of the second reference pixel, which correspond to each pixel of the current block, is smaller than a predetermined threshold value; and determining to perform the weighted bi-prediction when the difference value is not smaller than the predetermined threshold value.

An image decoding apparatus includes: an obtainer configured to obtain one or more prefixes including a first counter value indicating a number of additional syntax elements subsequent to main syntax elements from a received bitstream and obtain the additional syntax elements including weight information and information about whether to perform weighted bi-prediction on prediction units separated for predicting a current block, based on the one or more prefixes; and a decoder configured to generate a prediction block including a prediction value, based on the main syntax elements and the additional syntax elements.

Also, in the image decoding apparatus according to an embodiment, each of the additional syntax elements may include a set of two bins for indicating information about the weight information and the information about whether to perform the weighted bi-prediction.

Also, in the image decoding apparatus according to an embodiment, the one or more prefixes may include a second counter value indicating a number of additional syntax elements including information indicating that the weighted bi-prediction is to be performed among the additional syntax elements.

Also, in the image decoding apparatus according to an embodiment, the additional syntax elements may be obtained by determining probability information of bins of the additional syntax elements based on the first counter value and the second counter value and sequentially decoding the bins of the additional syntax elements based on the probability information.

Also, in the image decoding apparatus according to an embodiment, the probability information may be determined by decrementing the second counter value according to sequential decoding of the bins of the additional syntax elements and updating the probability information by using the first counter value and the decremented second counter value.

Also, in the image decoding apparatus according to an embodiment, in order to generate the prediction block, the decoder may determine a first correspondence region of a first reference picture and a second correspondence region of a second reference picture, which are most similar to the current block, from a first motion vector and a second motion vector included in the main syntax elements, confirm whether to perform the weighted bi-prediction based on the first correspondence region and the second correspondence region, and perform a weighted bi-directional motion compensation of a block unit or a pixel unit on the current block by using the first motion vector, the second motion vector, and the weight information.

Also, in the image decoding apparatus according to an embodiment, in order to confirm whether to perform the weighted bi-prediction, the decoder may perform no weighted bi-prediction when a difference value between a first correspondence pixel of the first reference picture and a second corresponding pixel of the second reference pixel, which correspond to each pixel of the current block, is smaller than a predetermined threshold value, and determine to perform the weighted bi-prediction when the difference value is not smaller than the predetermined threshold value.

An image encoding method according to an embodiment includes: determining a first motion vector and a second motion vector indicating a first correspondence region and a second correspondence region which are most similar to a current block in a first reference picture and a second reference picture; confirming whether to perform weighted bi-prediction based on the first correspondence region and the second correspondence region; when it is confirmed that the bi-prediction is to be performed, performing the weighted bi-prediction of a block unit or a pixel unit on the current block by using the first motion vector, the second motion vector, and a weight value; and adding additional syntax elements to an encoded bitstream, the additional syntax elements including a prefix indicating a number of additional syntax elements and information indicating whether to perform the weighted bi-prediction on the current block.

Various embodiments of the present disclosure can provide an efficient image encoding method and apparatus and an efficient image decoding method and apparatus, which reduce parsing dependency by using one or more prefixes and additional syntax elements added to a bitstream in order to perform weighted bi-prediction.

MODE OF THE INVENTION

The terms "unit" and "module" as used herein represent a unit for processing at least one function or operation, which may be implemented by hardware, software, or a combination thereof.

The terms "an embodiment" or "embodiments" as used herein mean the characteristics, structures, features, and the like described in connection with the embodiments included in at least one embodiment. Therefore, the phrase "an embodiment" or "embodiments" appearing in various places throughout this specification does not necessarily indicate the same embodiment.

In this specification, coding may be construed as encoding or decoding according to circumstances, and information may be understood as including all of values, parameters, coefficients, elements, and the like.

A "screen" or a "picture" generally means a unit that represents a single image in a specific time zone, and a "slice", a "frame", or the like is a unit that constitutes a part of a picture in coding of an actual video signal, and may be used interchangeably with a picture.

A "pixel" or a "pel" means a smallest unit that constitutes a single image. Also, a "sample" may be used as a term indicating a value of a specific pixel. The sample may be divided into luma and chroma components, but may be used as a term including both of them. The chroma component represents a difference between predetermined colors and generally includes Cb and Cr.

A "unit" represents a basic unit of image processing or a specific position of an image, such as a coding unit (CU), a prediction unit (PU), and a transformation unit (TU), and in some cases, may be used interchangeably with a "block" or an "area". Also, the block may also be used as a term indicating a set of transform coefficients or samples composed of M columns and N rows.

A "current block" may mean a block of an image to be encoded or decoded.

A "neighboring block" represents at least one encoded or decoded block adjacent to a current block. For example, the neighboring block may be located at an upper end of the current block, a right upper end of the current block, a left side of the current block, or a left upper end or a left lower end of the current block. Also, the neighboring block may include a temporally neighboring block as well as a spatially neighboring block. For example, a co-located block, which is a temporally neighboring block, may include a block located at the same position as a current block of a reference picture, or a neighboring block adjacent to the block located at the same position.

Hereinafter, methods and apparatuses for encoding or decoding an image using syntax signaling for adaptive weighted prediction, according to various embodiments will be described with reference to FIGS. 1 through 8. Also, image encoding and decoding apparatuses and image encoding and decoding methods based on coding units having a tree structure, according to various embodiments, will be described with reference to FIGS. 9 through 21.

Figure 1A:
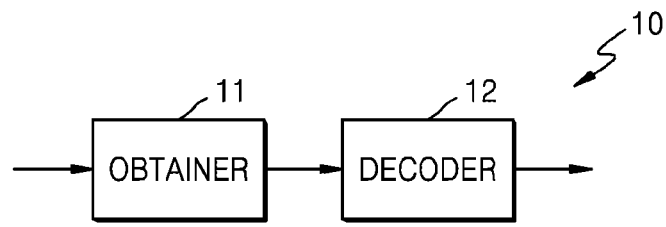
FIG. 1A is a schematic block diagram of an image decoding apparatus 10 according to an embodiment.

FIG. 1A is a schematic block diagram of an image decoding apparatus 10 according to an embodiment.

Referring to FIG. 1A, the image decoding apparatus 10 according to the embodiment includes an obtainer 11 and a decoder 12.

When a bitstream is input from an image encoding apparatus, the input bitstream may be decoded according to an inverse process of a procedure of processing image information in the encoding apparatus.

For example, when variable length coding (VLC) such as context-adaptive variable length coding (CAVLC) is used for performing entropy encoding in the image encoding apparatus, the obtainer 11 may perform entropy decoding by implementing the same VLC table as the VLC table used in the encoding apparatus. Also, when content-adaptive binary arithmetic coding (CABAC) is used for performing entropy encoding in the image encoding apparatus, the obtainer 11 may perform entropy decoding using CABAC corresponding thereto. Detailed operations of the entropy decoding performed by the obtainer 11, according to an embodiment, will be described below with reference to FIGS. 5 through 7.

In the image decoding apparatus 10, information for generating a prediction block among pieces of entropy-decoded information and a residual value obtained by performing entropy decoding are used for reconstructing an image in the decoder 12. Specifically, the decoder 12 may rearrange an entropy-decoded bitstream based on a rearranging method in the image encoding apparatus. The decoder 12 may rearrange coefficients expressed in a one-dimensional vector form by reconstructing the coefficients into coefficients of a two-dimensional block form. The decoder 12 may receive information about coefficient scanning performed by the encoding apparatus, and perform rearrangement through a method of inversely scanning based on the scanning order performed by the encoding apparatus. Also, the decoder 12 may perform inverse quantization based on the quantization parameters provided by the encoding apparatus and the rearranged coefficient values of the blocks. The decoder 12 may perform inverse discrete cosine transform (DCT) or inverse discrete sine transform (DST) on DCT or DST performed by a transformer of the encoding apparatus with respect to the result of quantization performed by the image encoding apparatus. The inverse transformation may be performed based on an image splitting unit or a transmission unit determined by the encoding apparatus. The transformer of the encoding apparatus may selectively perform DCT or DST according to a plurality of pieces of information such as a prediction method, a size of a current block, a prediction direction, and the like, and the decoder 12 of the image decoding apparatus 10 may perform inverse transformation based on transformation information performed in the transformer of the image encoding apparatus.

The prediction block may be generated based on information associated with prediction block generation provided by the obtainer 11 and previously decoded block and/or picture information. The reconstructed block may be generated by using the prediction block and the residual block. A detailed prediction method performed by the decoder 12 is the same as a prediction method performed by the image encoding apparatus.

When a prediction mode of a current block is an intra prediction mode, intra prediction may be performed to generate a prediction block based on pixel information in a current picture.

When a prediction mode of a current block is an inter prediction mode, at least one of a picture before a current picture or a picture after the current picture is set as a reference picture, and inter prediction may be performed on a current block based on information included in the reference picture. Specifically, in the inter prediction, a reference picture may be selected with respect to a current block, a reference block having the same size as that of the current block may be selected, and a prediction block may be generated with respect to the current block. For example, in the inter prediction, the prediction block may be generated so that the residual signal of the current block is minimized, and the motion vector is also minimized. At this time, in order to utilize information about the reference picture, information about neighboring blocks of the current picture may be used. For example, the prediction block of the current block may be generated based on information about neighboring blocks through a skip mode, a merge mode, an advanced motion vector prediction (AMVP), or the like.

The prediction block may be generated by performing motion compensation on the pixel value of the current block. The motion vector of the current block and the position of the reference block indicated by the motion vector may be expressed by sub-sample unit such as ½ pixel sample unit and ¼ pixel sample unit. For example, a motion vector of a luma pixel may be expressed by ¼ pixel unit, and a motion vector of a chroma pixel may be expressed by ⅛ pixel unit.

Motion information required for the inter prediction of the current block, for example, information about a motion vector or a reference picture index may be derived in response to checking a skip flag, a merge flag, or the like received from the image encoding apparatus.

The data unit in which the prediction is performed and the processing unit in which the prediction method and the detailed contents are determined may be different from each other. For example, a prediction mode may be determined as a prediction unit and prediction may be performed in the prediction unit, and a prediction mode may be determined as a prediction unit and intra prediction may be performed in a transformation unit.

The decoder 12 may reconstruct an original image by adding a residual block to a prediction block output after the prediction has been performed.

The reconstructed block and/or picture may be provided to a filter (not illustrated). The filter (not illustrated) may apply deblocking filtering, sample adaptive offset (SAO), and/or adaptive loop filtering to the reconstructed block and/or picture.

A memory (not illustrated) may store the reconstructed picture or block, so that the reconstructed picture or block is used as the reference picture or the reference block, or may provide the reconstructed picture to an output unit.

Figure 1B:
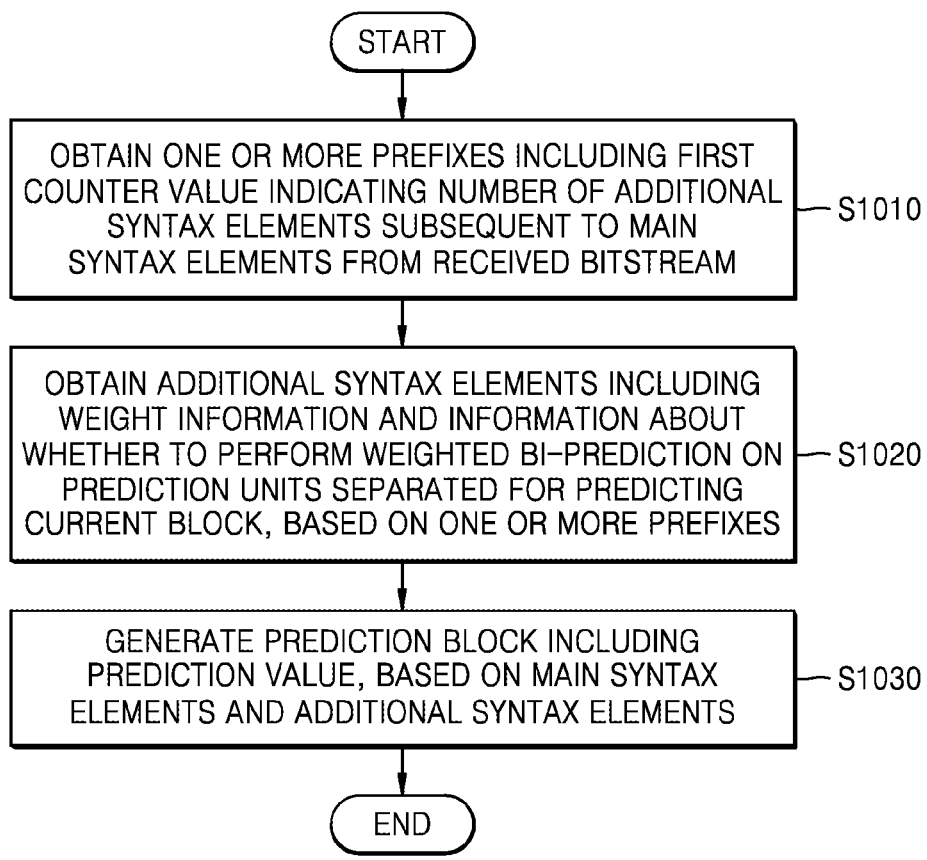
FIG. 1B is a flowchart for describing an image decoding method according to an embodiment.

FIG. 1B is a flowchart for describing an image decoding method according to an embodiment.

The image decoding method, which is performed by the image decoding apparatus 10, according to the embodiment includes: obtaining one or more prefixes including a first counter value indicating the number of additional syntax elements subsequent to main syntax elements from a received bitstream (S1010); obtaining the additional syntax elements including weight information and information about whether to perform weighted bi-prediction on prediction units separated for predicting a current block, based on the one or more prefixes (S1020); and generating a prediction block including a prediction value, based on the main syntax elements and the additional syntax elements.

Specifically, the main syntax elements, the one or more prefixes, and the additional syntax elements may be signaled in a largest coding unit (LCU) structure or a slice structure. In the image decoding method according to the embodiment, the main syntax elements may include motion information about one or more prediction units separated from coding units. In the image decoding method according to the embodiment, the one or more prefixes may include the first counter value indicating the number of additional syntax elements. In the image decoding method according to another embodiment, the one or more prefixes may include a second counter value indicating the number of additional syntax elements including information indicating that the weighted bi-prediction is to be performed among the additional syntax elements. In the image decoding method according to the embodiment, each of the additional syntax elements may include a set of two bins for indicating information about whether to perform weighted bi-prediction and weight information.

Figure 2A:
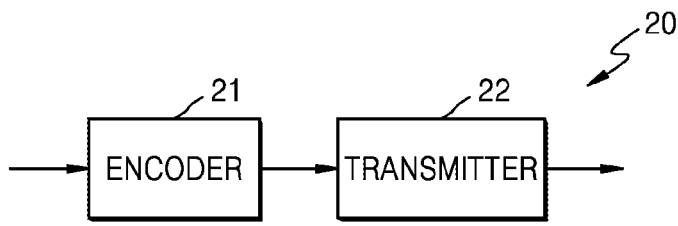
FIG. 2A is a schematic block diagram of an image encoding apparatus 20 according to an embodiment.

FIG. 2A is a schematic block diagram of an image encoding apparatus 20 according to an embodiment.

Referring to FIG. 2A, the image encoding apparatus 20 according to the embodiment includes an encoder 21 and a transmitter 22.

The image encoding apparatus 20 according to the embodiment receives images in units of slices, pictures, or the like, partitions each image into blocks, and encodes each image based on blocks. A type of the block may be a square, a rectangle, or any geometric shape. The block is not limited to a data unit having a constant size. The block according to the embodiment may be a largest coding unit, a coding unit, a prediction unit, a transformation unit, or the like from among coding units having a tree structure. Image encoding or decoding methods based on the coding units having the tree structure will be described below with reference to FIGS. 9 through 21.

The encoder 21 performs inter prediction to find a prediction value of a current block in a current picture. In performing inter prediction, the encoder 21 according to the embodiment may perform bi-prediction using an average value, and may obtain a prediction value of a current block by performing weighted bi-prediction to which a weighted value is applied.

The transmitter 22 according to the embodiment transmits prediction information determined by the encoder 21 in the form of a bitstream. Also, the transmitter 22 may insert motion information about prediction units, information indicating whether to perform weighted bi-prediction, weight information, and the like into the bitstream in the form of a syntax element, a flag, an index, or the like, and then transmit the bitstream to the image decoding apparatus 10.

Figure 2B:
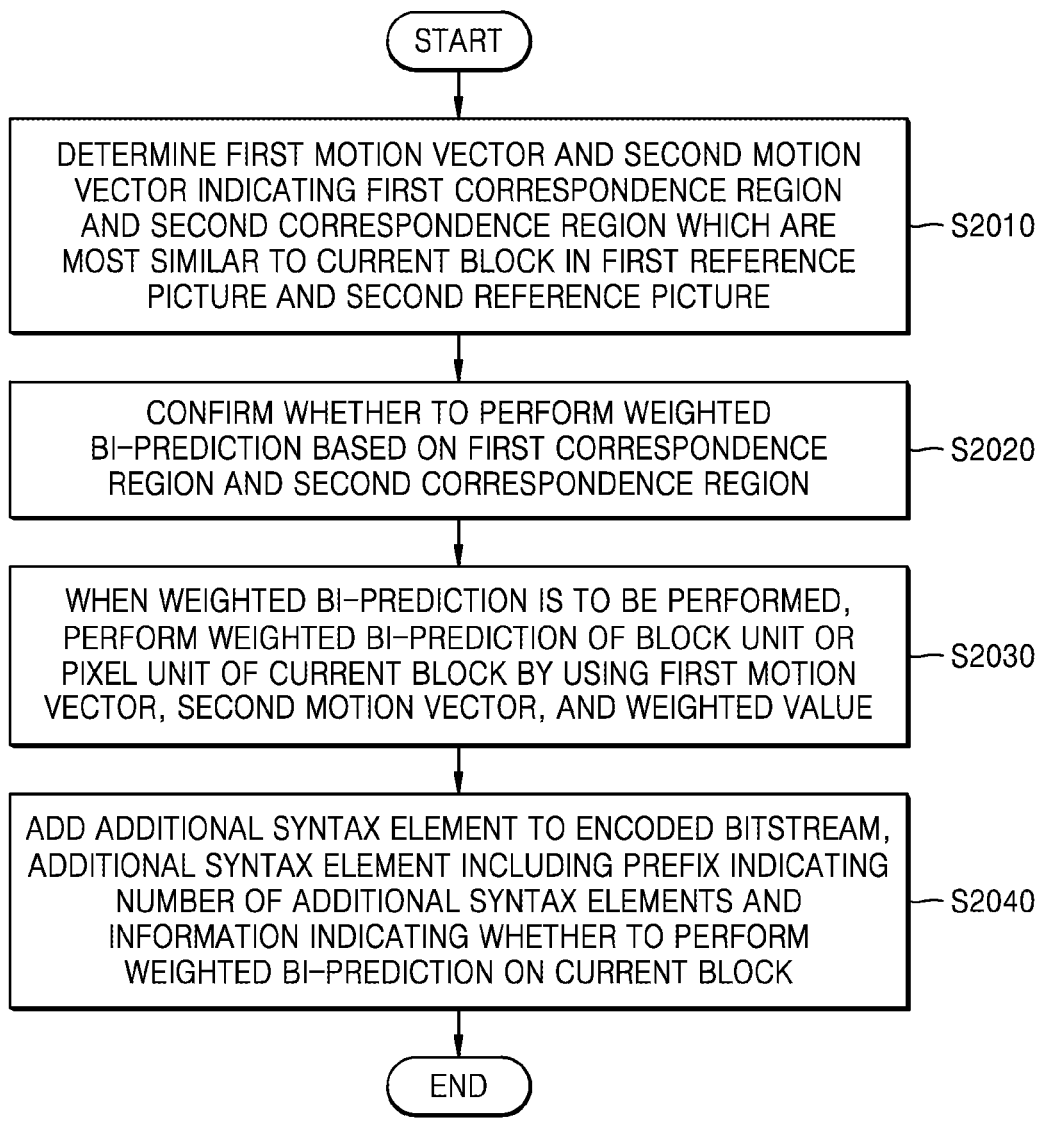
FIG. 2B is a flowchart for describing an image encoding method according to an embodiment.

FIG. 2B is a flowchart for describing an image encoding method according to an embodiment.

The image encoding method, which is performed by the image encoding apparatus 20, according to the embodiment includes: determining a first motion vector and a second motion vector indicating a first correspondence region and a second correspondence region which are most similar to a current block in a first reference picture and a second reference picture (S2010); confirming whether to perform weighted bi-prediction based on the first correspondence region and the second correspondence region (S2020); when the weighted bi-prediction is to be performed, performing the weighted bi-prediction of a block unit or a pixel unit of the current block by using the first motion vector, the second motion vector, and a weighted value (S2030); and adding an additional syntax element to an encoded bitstream, the additional syntax element including a prefix indicating the number of additional syntax elements and information indicating whether to perform the weighted bi-prediction on the current block.

In the image encoding method according to the embodiment, main syntax elements, one or more prefixes, and additional syntax elements may be added to a largest coding unit structure or a slice structure. In the image encoding method according to the embodiment, the main syntax elements may include motion information about one or more prediction units separated from coding units. In the image encoding method according to the embodiment, the one or more prefixes may include a first counter value indicating the number of additional syntax elements. In the image encoding method according to another embodiment, the one or more prefixes may include a second counter value indicating the number of additional syntax elements including information indicating that the weighted bi-prediction is to be performed among the additional syntax elements. In the image encoding method according to the embodiment, each of the additional syntax elements may include information about whether to perform the weighted bi-prediction and weight information.

Figure 3:
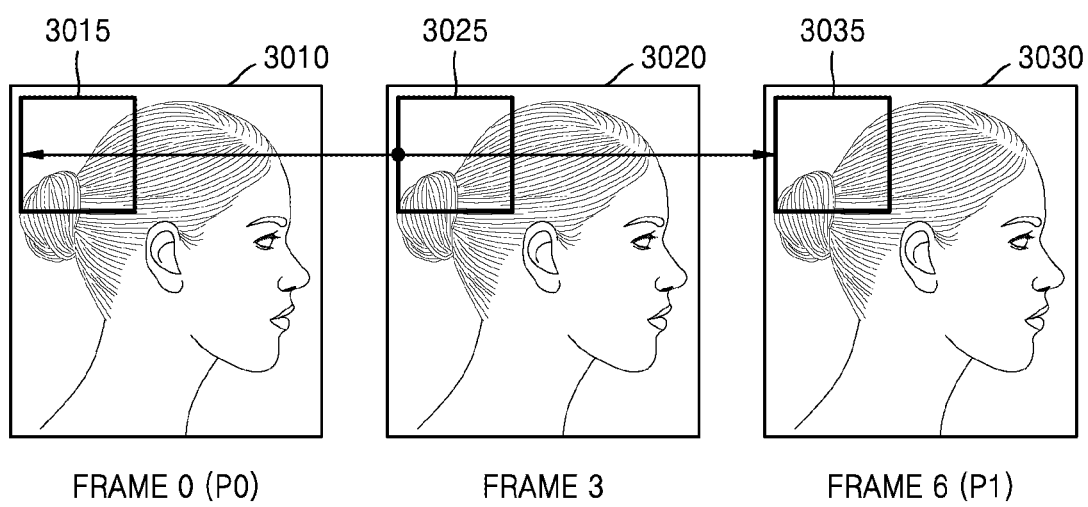
FIG. 3 illustrates reference frames used for bi-prediction, according to an embodiment.

FIG. 3 illustrates reference frames used for bi-prediction, according to an embodiment.

In an inter prediction mode, the image encoding apparatus 20 or the image decoding apparatus 10 may derive motion information of a current block and perform inter prediction on the current block based on the derived motion information.

An image used for predicting the current block is referred to as a reference picture or a reference frame. A region in the reference picture may be represented by using a reference picture index (refIdx) indicating the reference picture, a motion vector, or the like.

Pictures used for predicting the current picture may constitute a reference picture list, and the reference picture index may indicate a specific reference picture in the reference picture list. In the case of a P picture, one reference picture list, for example, reference list 0, is required, and in the case of a B picture, two reference picture lists, for example, reference list 0 and reference list 1, are required.

Specifically, an I picture is a picture that is encoded or decoded by intra prediction. The P picture is a picture that can be encoded or decoded by inter prediction using at least one motion vector and reference picture index so as to predict a sample value of each block. The B picture is a picture that can be encoded or decoded by inter prediction using at least two motion vectors and reference picture indices so as to predict a sample value of each block.

The P picture requires one reference picture list, which is referred to as reference picture list 0 (L0).

The B picture is a picture that can be encoded by forward, backward, or bi-directional inter prediction using one or more reference pictures, for example, two reference pictures. The B picture requires two reference picture lists, which are referred to as reference picture list 0 (L0) and reference picture list 1 (L1).

The inter prediction using the reference picture selected from L0 is referred to as L0 prediction, and the L0 prediction is commonly used in forward prediction. The inter prediction using the reference picture selected from L1 is referred to as L1 prediction, and the L1 prediction is commonly used in backward prediction. However, the directions of the L0 prediction and the L1 prediction are merely embodiments, and are not construed as being limited to the above-described embodiments. Also, the inter prediction using two reference pictures respectively selected from L0 and L1 is also referred to as bi-prediction.

The features of the I picture, the P picture, and the B picture may also be defined by not picture unit but slice unit. For example, an I slice having the feature of the I picture, a P slice having the feature of the P picture, and a B slice having the feature of the B picture may be defined in slice unit.

Referring to FIG. 3, according to an embodiment, a reference frame P0 3010 and a reference frame P1 3030 may be referred to for bi-prediction of a current frame 3020. The bi-prediction method according to the embodiment may utilize a block matching algorithm that generates a prediction value by selecting regions most similar to an currently encoded macro block in the reference frame P0 3010 and the reference frame P1 3030 by using a rectangular block 3025 having a constant size, for example, a 16×16 macro block. For example, regions 3015 and 3035 most similar to the encoded current block in the previous frame P0 3010 and the next frame P1 3030 may be searched for, and the prediction value of the current block may be generated by using an average value of pixels corresponding to the region 3015 found in the previous frame P0 3010 and the region 3035 found in the next frame P1 3030. The method of predicting the motion by using the average value of the pixels can search for the motion relatively accurately in most video sequences. However, when a difference between pixel values included in the region 3015 found in the P0 3010 and the region 3035 found in the P1 3030 is large, the prediction using the average value of the pixels may not be accurate. Therefore, the image encoding apparatus 20 and the image decoding apparatus 10, according to the embodiment, may generate a prediction block to which a weighted value is applied by taking into account the difference between the pixel values of the reference regions when the bi-prediction is performed.

The prediction method using the weighted value may be roughly classified into an explicit mode and an implicit mode. The explicit mode is a method of calculating weighted prediction parameters in slice unit, obtaining the optimal weighted prediction parameter for each slice, and transmitting the obtained optimal weighted prediction parameter to the image decoding apparatus, and the implicit mode is a method of calculating a weighted value through the same method prearranged between the image encoding apparatus and the image decoding apparatus by a temporal distance between the current image and the reference images without separately calculating or encoding the weighted value used for predicting the current block. When weighted uni-prediction is performed, Equation 1 may be used.

$$P'=w \times P+o \qquad \text{[Equation 1]}$$

P is a prediction pixel generated by using a motion vector in a reference picture, w is a scale factor for predicting a weighted value indicating a ratio relationship between a motion compensation prediction block and a weighted prediction block, o is an offset factor indicating a difference between a motion compensation prediction block for weighed prediction and a weighted prediction block, and P' is a weighted prediction block.

The scale factor and the offset factor are weighted prediction parameters. The weighted prediction parameters may be determined in arbitrary unit and encoded. The arbitrary unit may be a sequence, a picture, a slice, and the like. For example, when the optimal weighted prediction parameter is determined in slice unit and the mode is an explicit mode, the weighted prediction parameter may be encoded into a slice header or an adaptive parameter header. The image decoding apparatus may generate the weighted prediction block by using the weighted prediction parameter extracted from the corresponding header.

When the weighted bi-prediction according to the embodiment is performed, Equation 2 may be used.

$$P'=((w_0 \times P_0+o_0)+(w_1 \times P_1+o_1))/2 \qquad \text{[Equation 2]}$$

P0 is a prediction pixel generated by using a motion vector in a reference picture of L0, $w_0$ is a scale factor for weighted prediction of L0, $o_0$ is an offset factor for weighted prediction of L0, P1 is a prediction pixel generated by using a motion vector in a reference picture of L1, $w_1$ is a scale factor for weighted prediction of L1, $o_1$ is an offset factor for weighted prediction of L1, and P' is a weighted prediction pixel. In this case, L0 and L1 may calculate optimal weighted prediction parameters thereof, and in the explicit mode, the weighted prediction parameters may be encoded into an arbitrary header.

Figure 4A:
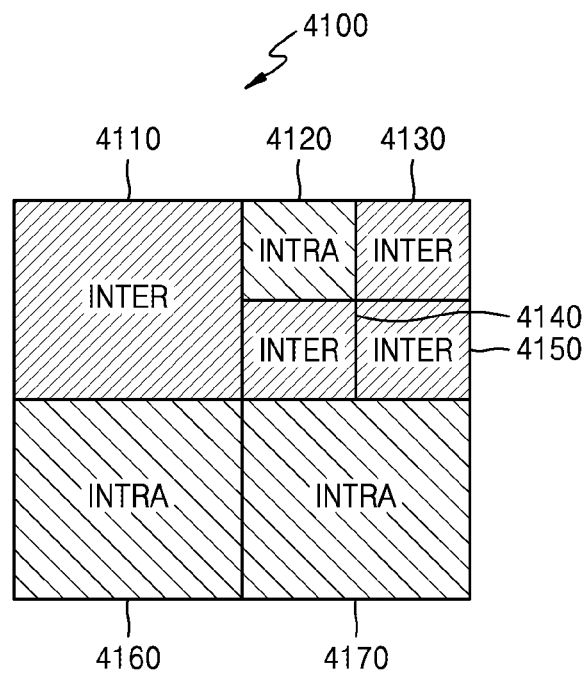
FIG. 4A is a view illustrating an example in which intra prediction and inter prediction are mixed in coding units, according to an embodiment.

FIG. 4A is a view illustrating an example in which intra prediction and inter prediction are mixed in coding units, according to an embodiment.

When encoding or decoding is performed by splitting a high-resolution input image in coding units, the image encoding apparatus 20 and the image decoding apparatus 10 may perform intra prediction or inter prediction by splitting coding units 4110, 4160, and 4170 in a coding tree unit (CTU) (for example, a square block having a pixel size of 64×64 to 256×256) 4100 into smaller coding units 4120, 4130, 4140, and 4150. At this time, the coding units in the CTU may be encoded by mixing the intra prediction and the inter prediction. The weighted bi-prediction according to the embodiment may be applied only to the coding units 4110, 4130, 4140, 4150 on which the inter prediction is performed. Therefore, the weighted bi-prediction may be performed when the corresponding coding unit satisfies a condition in which inter prediction is performed. An additional condition for performing the weighted bi-prediction will be described below with reference to FIG. 4B.

Figure 4B:
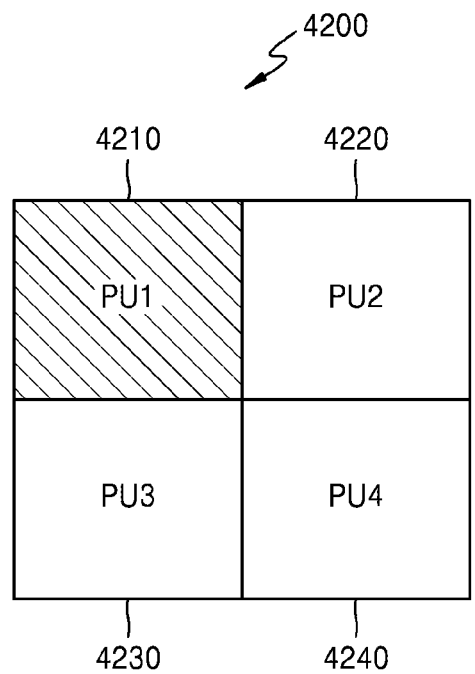
FIG. 4B is a view illustrating a condition in which weighted bi-prediction is performed in prediction units, according to an embodiment.

FIG. 4B is a view illustrating a condition in which the weighted bi-prediction is performed in the prediction unit, according to an embodiment.

Referring to FIG. 4B, prediction encoding may be performed based on a coding unit of a final depth according to various embodiments, that is, a coding unit that is no longer split. The coding unit that is no longer split and is the basis of prediction encoding will be referred to as "prediction unit". The coding unit may be predicted by at least one prediction unit. For example, prediction units PU1 4210, PU2 4220, PU3 4230, and PU4 4240 may be present in a current coding unit 4200 on which inter prediction is performed. If the PU1 4210 uses two motion vectors MV0 and MV1 for predicting a sample value of a current region and a difference value between pixels of reference pictures corresponding to the two motion vectors is not smaller than a predetermined threshold value, weighted bi-prediction can be performed on the PU1 4210. However, if the PU2 4220 uses only one motion vector MV0 for predicting a sample value of a current region, weighted bi-prediction cannot be performed on the PU2 4220. If the PU3 4230 and the PU4 4240 use two motion vectors MV0 and MV1 for predicting a sample value of a current region, but a difference value between pixels of reference pictures corresponding to the two motion vectors is smaller than a predetermined threshold value, weighted bi-prediction cannot be performed on the PU3 4230 and the PU4 4240. In this case, it is possible to perform bi-prediction using an average value of pixels of reference pictures corresponding to the two motion vectors MV0 and MV1. The predetermined threshold value according to the embodiment may be a value dependent on quantization parameter of the current prediction unit.

Figure 5A:
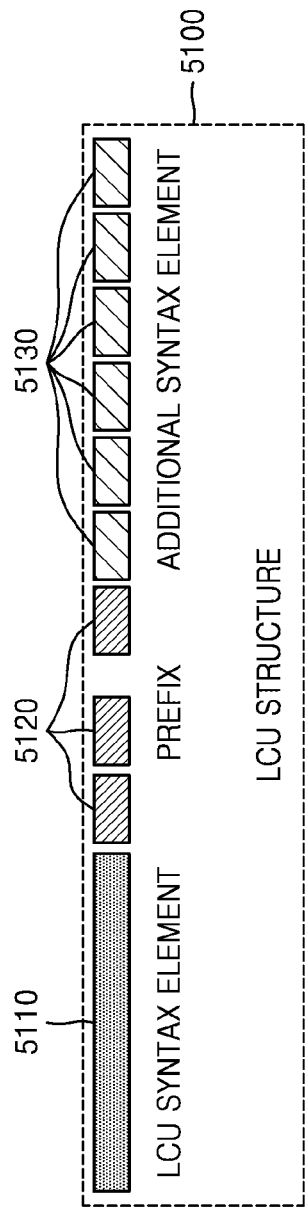
FIG. 5A illustrates syntax elements for performing weighted bi-prediction, according to an embodiment.
Figure 5B:
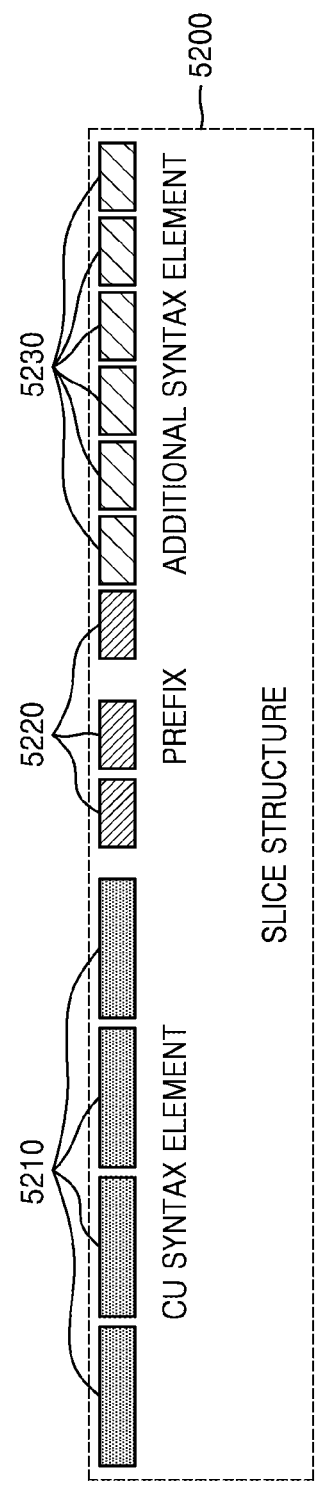
FIG. 5B illustrates syntax elements for performing weighted bi-prediction, according to another embodiment.

FIG. 5A illustrates syntax elements for performing weighted bi-prediction, according to an embodiment, and FIG. 5B illustrates syntax elements for performing weighted bi-prediction, according to another embodiment.

FIG. 5A illustrates a structure in which an LCU syntax element 5110, a prefix 5120, and an additional syntax element 5130 are included in an LCU structure 5100, and FIG. 5B illustrates a structure in which a CU syntax element 5210, a prefix 5220, and an additional syntax element 5230 are included in a slice structure 5200 The syntax elements illustrated in FIGS. 5A and 5B may include a parameter set, such as a video parameter set (VPS), a sequence parameter set (SPS), or a picture parameter set (PPS).

As illustrated in FIGS. 5A and 5B, the prefix 5120 or 5220 and the additional syntax element 5230 according to the embodiment may be added subsequently to the LCU syntax element 5110 or the CU syntax element 5210 in a bitstream. The LCU syntax element 5110 or the CU syntax element 5210 according to the embodiment may include information necessary for decoding an image. The prefix according to the embodiment may include a first counter value indicating the number of additional syntax elements. In addition, the prefix may also include a second counter value indicating the number of additional syntax elements including information indicating that the weighted bi-prediction is to be performed among the additional syntax elements. According to various embodiments, one or more prefixes may be present. The prefix may include other information necessary for parsing the additional syntax elements, in addition to the first counter value or the second counter value. Each of the additional syntax elements according to the embodiment may include a set of two bins for indicating information about whether to perform the weighted bi-prediction and weight information.

Figure 6A:
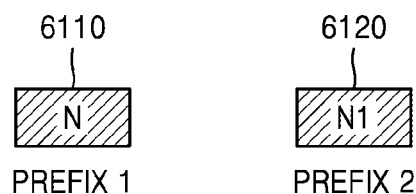
FIG. 6A illustrates a structure of a prefix according to an embodiment.

FIG. 6A illustrates a structure of a prefix according to an embodiment.

In a general entropy decoding operation, each bin for a block of data may be coded using probability estimation values of each bin. The probability estimation values may represent likelihood of the bin having a given binary value (for example, "0" or "1"). The probability estimation values may be included in a probability model that can also be referred to as a "context model". The image decoding apparatus may select the probability model by determining the context for the bin. The context for the bin of the syntax element may include values of bins associated with previously coded neighboring syntax elements.

As one example, the context for the bin of the syntax element (for example, coded block pattern, or "CBP") may include values of bins associated with previously coded neighboring syntax elements at the upper end and left side of a current syntax element. In this case, different probability models are defined for each context. After coding the bin, the probability model is additionally updated based on the value of the bin so as to reflect the latest probability estimation values.

However, when context adaptive coding is performed, in some examples, relatively high serial dependencies may be present due to a plurality of feedback loops. For example, the context indicating a specific probability model for coding the bin may be affected by values of previously coded bins, for example, bins associated with previously coded syntax elements. In addition, the probability model used for coding the bin may also be affected by values of previously coded bins.

Referring to FIG. 6A, one or more prefixes according to the embodiment may include a first prefix 6110 and a second prefix 6120. The first prefix 6110 may include a first counter value N indicating the number of additional syntax elements subsequent to the main syntax element. The second prefix 6120 may include a second counter value N1 indicating the number of additional syntax elements having 1 as a value of the first bin among additional syntax elements configured by a set of two bins. As a result, the image decoding apparatus 10 according to the embodiment may calculate an occurrence probability (P=N1/N) of the first bin of each syntax element by using the first prefix 6110 and the second prefix 6120. Since the image decoding apparatus 10 can accurately calculate the occurrence probability of the bin, it is possible to improve the problem of parsing dependency occurring in estimating the occurrence probability of the bin.

Figure 6B:
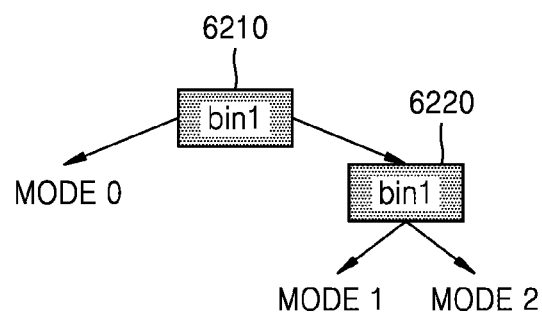
FIG. 6B illustrates a structure of an additional syntax element according to an embodiment.

FIG. 6B illustrates a structure of an additional syntax element according to an embodiment.

Referring to FIG. 6B, the additional syntax element according to the embodiment may include a set of two bins for indicating information about whether to perform the weighted bi-prediction and weight information. The additional syntax element according to the embodiment may signal three modes of prediction by using the first bin 6210 and the second bin 6220. When the first bin 6210 is 1, it may indicate that the weighted bi-prediction is performed, and when the first bin 6210 is 0, it may indicate that the weighted bi-prediction is not performed. When the weighted bi-prediction is performed, a weighted value may be determined according to the value of the second bin 6220. For example, when the value of the second bin 6220 is 0, the scale factor for the weighted prediction may be applied to P0 instead of P1, and when the value of the second bin 6220 is 1, the scale factor for the weighted prediction may be applied to P1 instead of P0.

Figure 7:
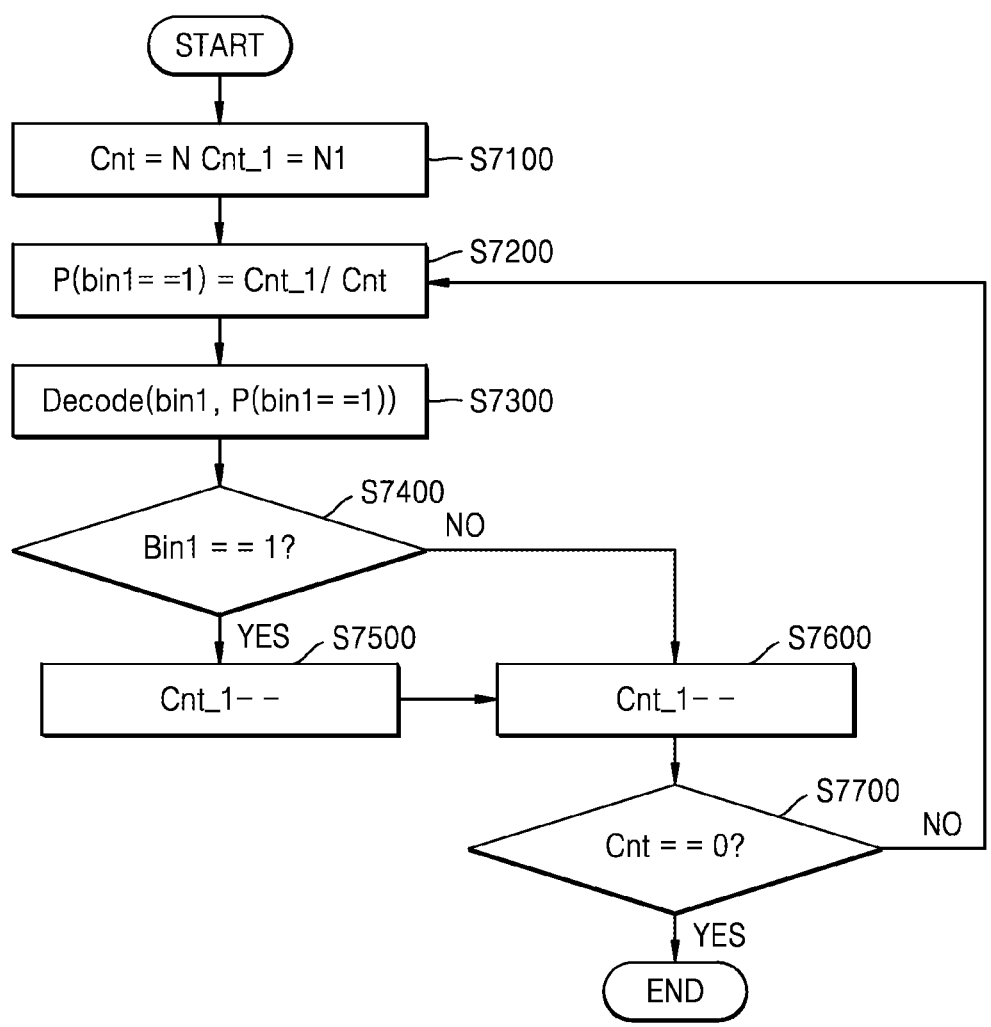
FIG. 7 is a flowchart of a method of obtaining additional syntax elements, according to an embodiment.

FIG. 7 is a flowchart of a method of obtaining additional syntax elements, according to an embodiment.

Referring to FIG. 7, the image decoding apparatus 10 according to the embodiment may use counter values included in one or more prefixes for obtaining additional syntax elements. The first counter value N included in the one or more prefixes indicates the number of additional syntax elements, and the second counter value N1 indicates the number of additional syntax elements having 1 as a value of a first bin among additional syntax elements (S7100). The image decoding apparatus 10 according to the embodiment calculates an occurrence probability P(bin1==1) of the first bin of the additional syntax element by Cnt_1/Cnt by using the first counter value N and the second counter value N1 (S7200). The image decoding apparatus 10 according to the embodiment entropy-decodes the bin of the additional syntax element based on the occurrence probability P(bin1==1) of the first bin (S7300), and if necessary, may entropy-decode the second bin. Subsequently, the image decoding apparatus 10 according to the embodiment decrements the first counter value and/or the second counter value according to sequentially entropy-decoding the bins of the additional syntax elements (S7500, S7600). After the entropy decoding is performed, the decremented first counter value and/or the decremented second counter value is used for updating probability information of the first bin of the additional syntax element.

Figure 8A:
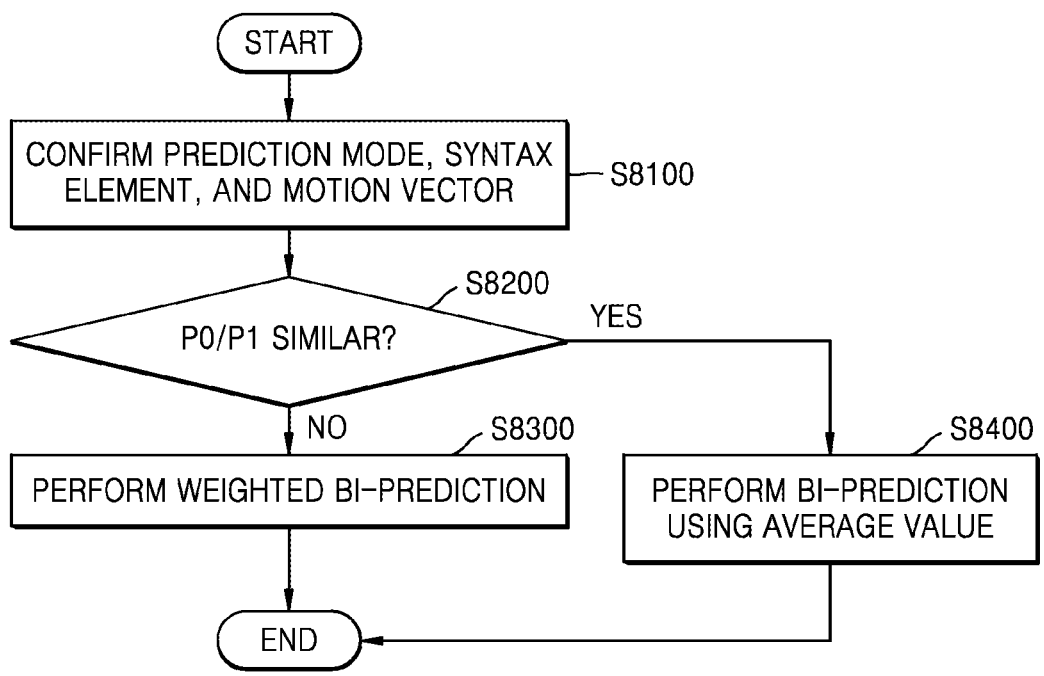
FIG. 8A is a flowchart of a method of confirming whether to perform weighted bi-prediction, according to an embodiment.

FIG. 8A is a flowchart of a method of confirming whether to perform weight bi-prediction, according to an embodiment.

The image encoding apparatus 20 and the image decoding apparatus 10, according to the embodiment, confirm a prediction mode of a coding unit, syntax information, and a motion vector (S8100). When the prediction mode of the coding unit is an intra mode, or when only one motion vector MV0 is present, the weighted bi-prediction is not performed and it is unnecessary to obtain additional syntax elements for prediction units. When the motion vectors MV0 and MV1 indicate the same reference frame, the weighted bi-prediction is not performed if a difference value $|MV0_x-MV1_x|+|MV0_y-MV1_y|$ between MV0 and MV1 is smaller than a predetermined threshold value MV_T. $MV0_x$ and $MV1_x$ represent x components of MV0 and MV1, respectively, and $MV0_y$ and $MV1_y$ represent y components of MV0 and MV1, respectively. In this case, bi-prediction using an average value is performed (S8400).

Subsequently, the image encoding apparatus 20 and the image decoding apparatus 10, according to the embodiment, check similarity between reference frames P0 and P1 (S8200). If a difference value $|P0(i,j)-P1(i,j)|$ between a corresponding pixel value of P0 and a corresponding pixel value of P1 is smaller than a predetermined threshold value TPixel(QP, Color), it is determined that the corresponding pixel does not pass the similarity check. A "nm" (not-matched) value is assigned to the pixel that does not pass the similarity check. If the difference value $|P0(i,j)-P1(i,j)|$ between the corresponding pixel value of P0 and the corresponding pixel value of P1 is not smaller than the predetermined threshold value TPixel(QP, Color), it is determined that the corresponding pixel passes the similarity check. An "m" (matched) value is assigned to the pixel that passes the similarity check.

Figure 8B:
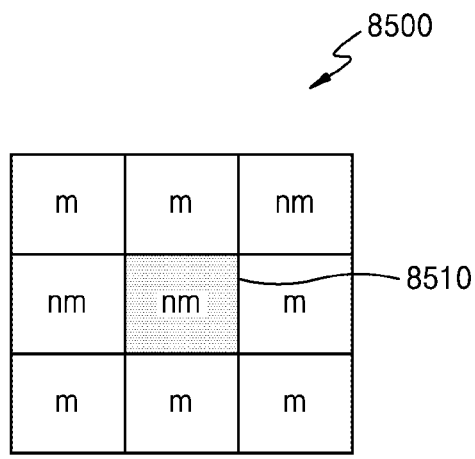
FIG. 8B is a view illustrating an example of a result of checking similarity with respect to each pixel in a reference frame.

FIG. 8B is a view illustrating an example of a result of checking similarity with respect to each pixel in a reference frame. As illustrated in FIG. 8B, since an "m" or "nm" value is assigned to pixels in a reference frame 8500, weighted values may be adaptively applied to individual pixels when the bi-prediction is performed. For example, bi-prediction using an average value may be performed on pixels to which "nm" is assigned, bi-prediction using a weighted value may be performed on pixels to which "m" is assigned (S8300).

The method of adaptively applying the weighted value to the individual pixels when the bi-prediction is performed, according to an embodiment, is referred to as weighted bi-prediction of pixel unit or weighted bi-directional motion compensation of pixel unit. The weighted bi-directional motion compensation of pixel unit according to the embodiment may be performed by using Equation 3 with respect to pixels to which "m" is assigned, and may be performed by using Equation 4 with respect to pixels to which "nm" is assigned.

$$(P0(i,j)+P1(i,j)+\text{offset})\!\gg\!\text{shift} \quad\quad\quad [\text{Equation 3}]$$

$$(W0\cdot P0(i,j)+W1\cdot P1(i,j)+\text{offset1})\!\gg\!\text{shift}+2 \quad\quad\quad [\text{Equation 4}]$$

P0(i,j) and P1(i,j) are prediction pixels of (i, j) coordinates generated by using the motion vectors in the reference pictures of L0 and L1, respectively. w0 and w1 are scale factors for the weighted prediction of L0 and L1, respectively. offset and offset1 are offset factors for the weighted prediction. shift is an operator that increments or decrements a value by shifting data in bit units.

The image encoding apparatus 20 and the image decoding apparatus 10, according to the embodiment, may perform weighted bi-directional motion compensation of block unit, instead of weighted bi-direction motion compensation of pixel unit. The weighted bi-directional motion compensation of block unit, according to the embodiment, is a method of performing weighted bi-prediction on all pixels in a prediction unit including pixels to which "m" is assigned. That is, the weighted bi-prediction of block unit, according to the embodiment, may perform the motion compensation by applying Equation 5 to all pixels in the prediction unit. Information about the weighted value may be included in the additional syntax element.

$$(W0\cdot P0(i,j)+W1\cdot P1(i,j)+\text{offset1})\!\gg\!\text{shift}+2 \quad\quad\quad [\text{Equation 5}]$$

Referring to FIG. 8B, the image encoding apparatus 20 and the image decoding apparatus 10, according to the embodiment, may perform additional similarity check on each pixel in the reference frame 8500. When the sum |Σnm| of values of neighboring pixels to which "nm" is applied among neighboring pixels of the pixel 8510 to which "nm" is applied is smaller than a predetermined threshold value T2, the "nm" value assigned to the pixel 8510 may be modified into the "m" value. That is, the image encoding apparatus 20 and the image decoding apparatus 10, according to the embodiment, may use the values of the neighboring pixels of the pixels to which "nm" is assigned, when checking similarity between the reference frames P0 and P1. The image encoding apparatus 20 and the image decoding apparatus 10, according to the embodiment, adaptively perform the weighted bi-prediction by checking the similarity between the reference frames P0 and P1 in various methods, thereby improving the accuracy of the encoding and decoding operations.

In the various embodiments described above, the reference block used when the inter prediction is performed may be the coding unit or the prediction unit. The coding unit may be one of coding trees hierarchically configured according to the depth. Hereinafter, a relationship between the coding unit, the prediction unit, and the transformation unit, which are data processing units, in order to perform video encoding and decoding based on the coding unit of the hierarchical structure, will be described with reference to FIGS. 9 to 21.

Figure 9:
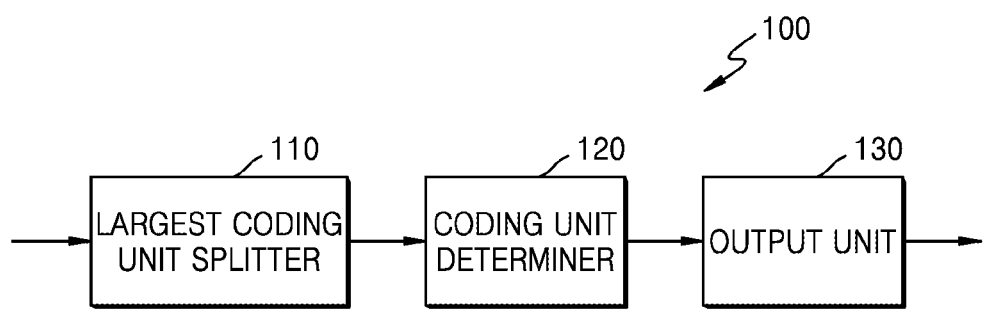
FIG. 9 illustrates a block diagram of a video encoding apparatus 100 based on coding units according to a tree structure, according to various embodiments.

FIG. 9 illustrates a block diagram of a video encoding apparatus based on coding units according to tree structure 100, according to various embodiments.

The video encoding apparatus based on coding units according to tree structure 100 according to the embodiment includes a coding unit determiner 120 and an output unit 130. Hereinafter, for convenience of description, the video encoding apparatus based on coding units according to tree structure 100 according to the embodiment will be abbreviated to the 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to various embodiments may be a data unit having a size of 32×32, 64×64, 128×128, 256×256, etc., wherein a shape of the data unit is a square having a width and length in powers of 2.

A coding unit according to various embodiments may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to various embodiments is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines a final depth by encoding the image data in the deeper coding units according to depths, according to the largest coding unit of the current picture, and selecting a depth having the minimum encoding error. The determined final depth and image data according to largest coding units are output to the output unit 130.

The image data in the largest coding unit is encoded based on the deeper coding units corresponding to at least one depth equal to or below the maximum depth, and results of encoding the image data are compared based on each of the deeper coding units. A depth having the minimum encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to various embodiments may determine coding units having a tree structure included in the largest coding unit. The 'coding units having a tree structure' according to various embodiments include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to various embodiments is an index related to the number of splitting times from a largest coding unit to a smallest coding unit. A first maximum depth according to various embodiments may denote the total number of splitting times from the largest coding unit to the smallest coding unit. A second maximum depth according to various embodiments may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this regard, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to various embodiments may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth according to various embodiments, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to various embodiments may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, or partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to various embodiments may perform not only the transformation on the image data in a coding unit based not only on the coding unit for encoding the image data, but also may perform the transformation on the image data based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to various embodiments. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to various embodiments. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information about prediction and transformation. Accordingly, the coding unit determiner 120 not only determines a depth having a minimum encoding error but also determines a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to various embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one depth determined by the coding unit determiner 120, and split information according to depths.

The encoded image data may be obtained by encoding residual data of an image.

The split information according to depth may include information about the depth, about the partition mode in the prediction unit, about the prediction mode, and about split of the transformation unit.

Final depth information may be defined by using split information according to depths, which indicates whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, data of the largest coding unit may vary according to locations since the data is hierarchically split according to depths, and thus a depth and split information may be set for the data.

Accordingly, the output unit 130 according to various embodiments may assign encoding information about a corresponding depth and an encoding mode to at least one of the coding unit, the prediction unit, and a minimum unit included in the largest coding unit.

The minimum unit according to various embodiments is a square data unit obtained by splitting the smallest coding unit constituting the lowermost depth by 4. Alternatively, the minimum unit according to various embodiments may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information, prediction information, and slice type information, which are related to prediction.

In the video encoding apparatus 100 according to the simplest embodiment, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined in consideration of characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to various embodiments, image compression efficiency may be increased since a coding unit is adjusted while considering characteristics of an image while increasing a maximum size of a coding unit while considering a size of the image.

Figure 10:
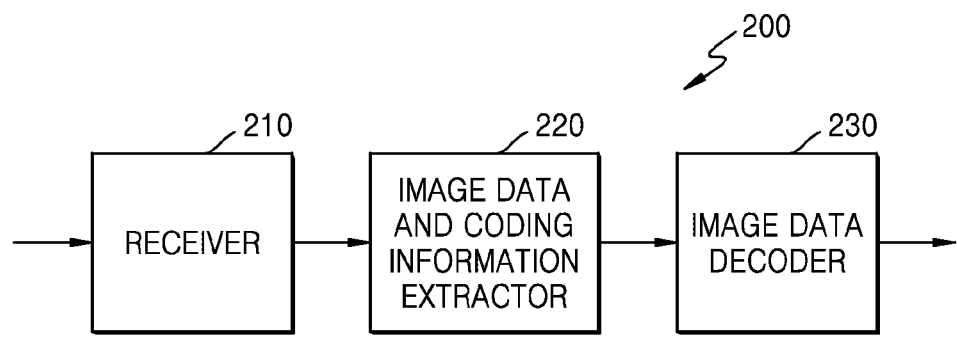
FIG. 10 illustrates a block diagram of a video decoding apparatus 200 based on coding units according to a tree structure, according to various embodiments.

FIG. 10 illustrates a block diagram of the video decoding apparatus based on coding units according to a tree structure 200, according to various embodiments.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various split information, for decoding operations of the video decoding apparatus 200 according to various embodiments are identical to those described with reference to FIG. 10 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information for the coding units having a tree structure according to each largest coding unit, from the parsed bitstream. The extracted final depth and split information are output to the image data decoder 230. That is, the image data in a bitstream is split into the largest coding unit so that the image data decoder 230 decodes the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each largest coding unit extracted by the image data and encoding information extractor 220 is a depth and split information determined to generate a minimum encoding error when an encoder, such as the video encoding apparatus 100 according to various embodiments, repeatedly performs encoding for each deeper coding unit according to depths according to each largest coding unit. Accordingly, the video decoding apparatus 200 may reconstruct an image by decoding data according to an encoding method that generates the minimum encoding error.

Since encoding information about a depth and an encoding mode according to various embodiments may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 may reconstruct the current picture by decoding the image data in each largest coding unit based on the depth and the split information according to the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a spatial region of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 11:
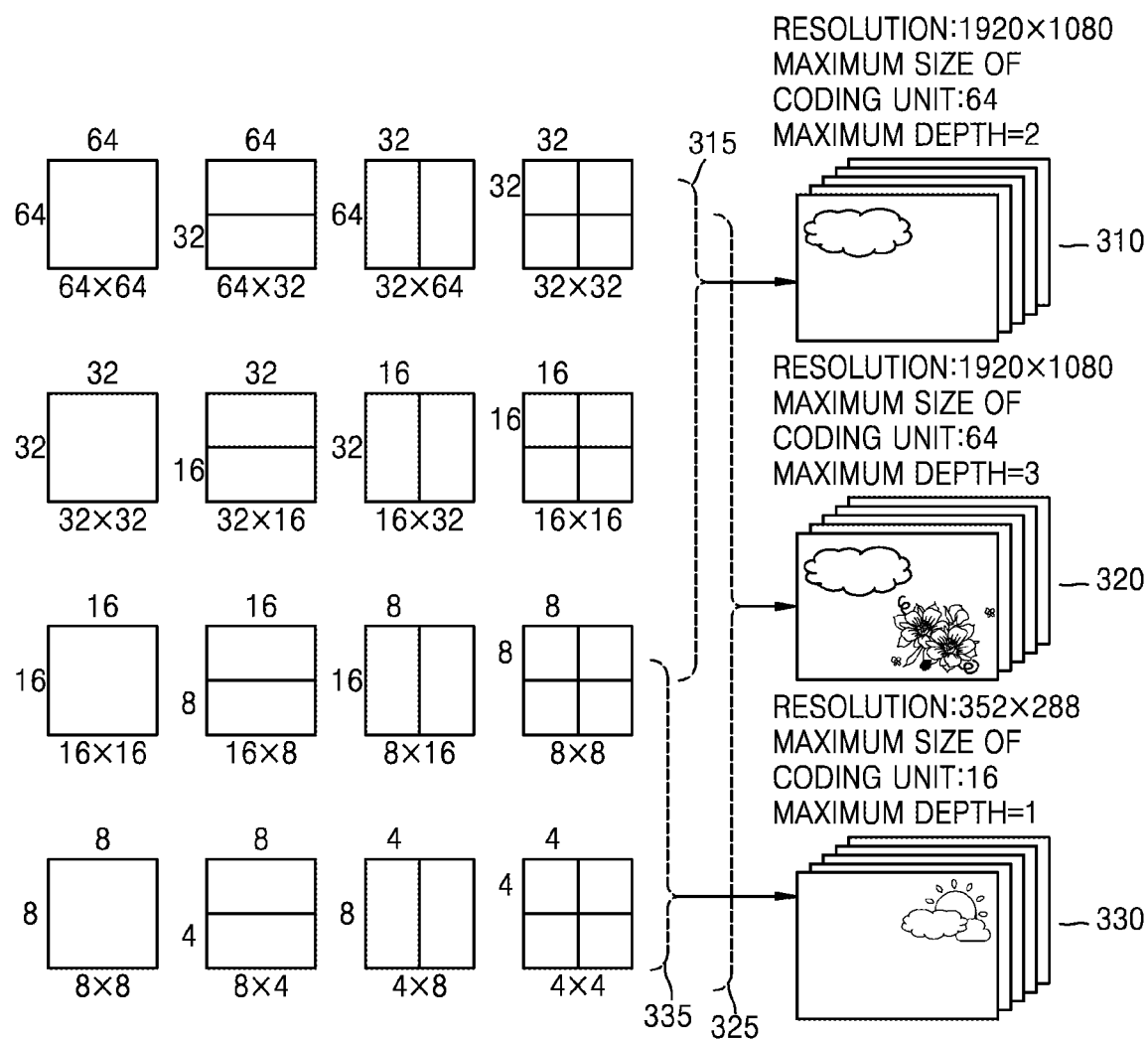
FIG. 11 illustrates a concept of coding units, according to various embodiments.

FIG. 11 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 11 denotes a total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the video data 310 may include a largest coding unit having a long axis size of 64, and coding units having long axis sizes of 32 and 16 since depths are deepened to two layers by splitting the largest coding unit twice. Since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 12:
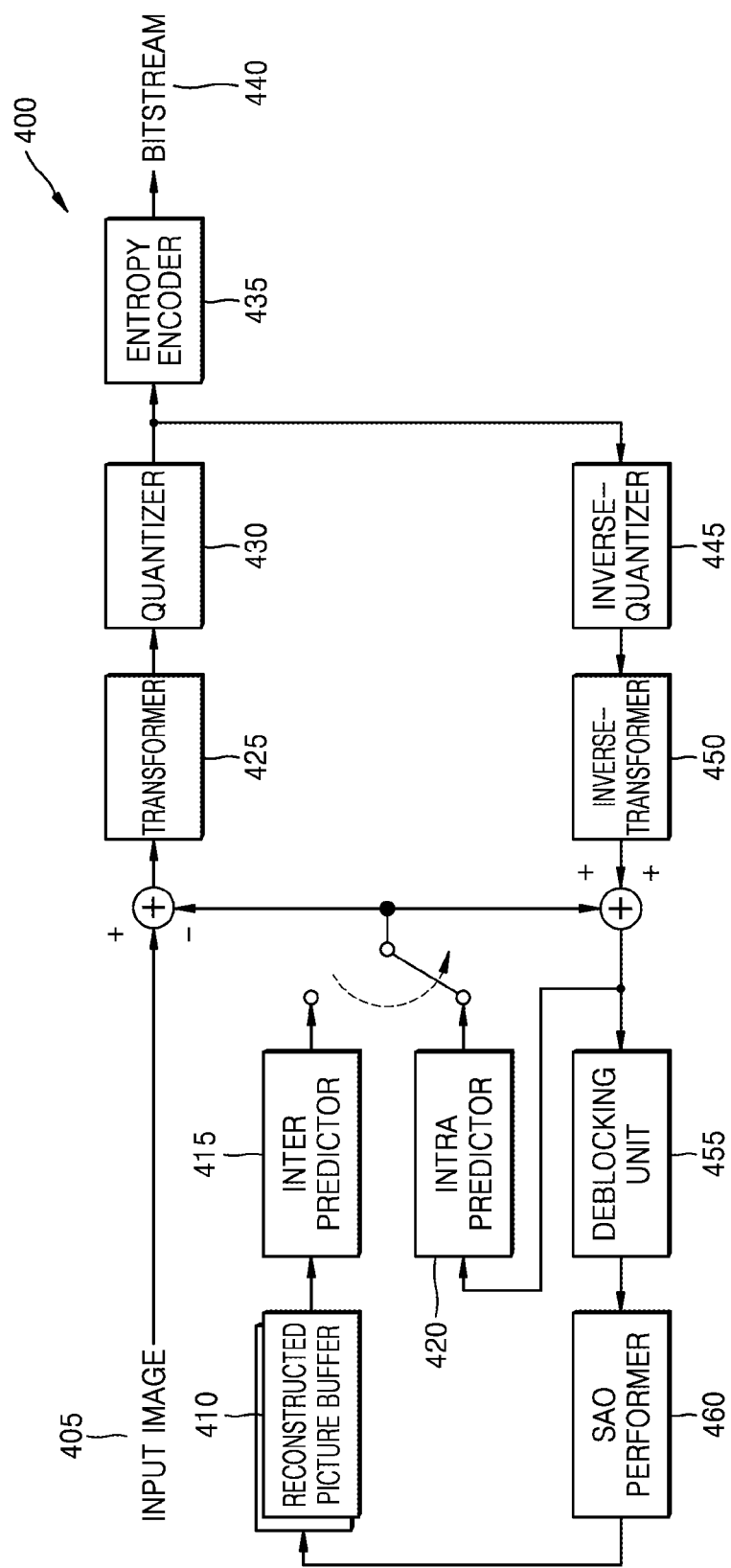
FIG. 12 illustrates a block diagram of an image encoder 400 based on coding units, according to various embodiments.

FIG. 12 is a block diagram of an image encoder 400 based on coding units, according to various embodiments.

The image encoder 400 according to various embodiments performs operations of the coding unit determiner 120 of the video encoding apparatus 100 so as to encode image data. In other words, an intra predictor 420 performs intra prediction on coding units in an intra mode, from among a current image 405, per prediction unit, and an inter predictor 415 performs inter prediction on coding units in an inter mode by using the current image 405 and a reference image obtained by a reconstructed picture buffer 410, per prediction unit. The current image 405 may be split into largest coding units, and then the largest coding units may be sequentially encoded. In this regard, the largest coding unit that is to be split into coding units having a tree structure may be encoded.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is reconstructed as the residue data in a spatial domain through an inverse-quantizer 445 and an inverse-transformer 450. The reconstructed residue data in the spatial domain is added to the prediction data of the coding unit of each mode output from the intra predictor 420 or the inter predictor 415 to be reconstructed as data in a spatial domain of the coding unit of the current image 405. The reconstructed data in the spatial domain is generated as a reconstructed image through a deblocking unit 455 and an SAO performer 460. The generated reconstructed image is stored in the reconstructed picture buffer 410. Reconstructed images stored in the reconstructed picture buffer 410 may be used as a reference image for inter prediction of another image. The quantized transformation coefficient obtained through the transformer 425 and the quantizer 430 may be output as a bitstream 440 through an entropy encoder 435.

In order for the image encoder 400 according to various embodiments to be applied in the video encoding apparatus 100, components of the image encoder 400, i.e., the inter predictor 415, the intra predictor 420, the transformer 425, the quantizer 430, the entropy encoder 435, the inverse quantizer 445, the inverse transformer 450, the deblocking unit 455, and the SAO performer 460 perform operations based on each coding unit among coding units having a tree structure per largest coding unit.

In particular, the intra predictor 420 and the inter predictor 415 may determine a partition mode and a prediction mode of each coding unit from among the coding units having a tree structure, by taking into account the maximum size and the maximum depth of a current largest coding unit, and the transformer 425 may determine whether to split a transformation unit according to a quad tree in each coding unit from among the coding units having a tree structure.

Figure 13:
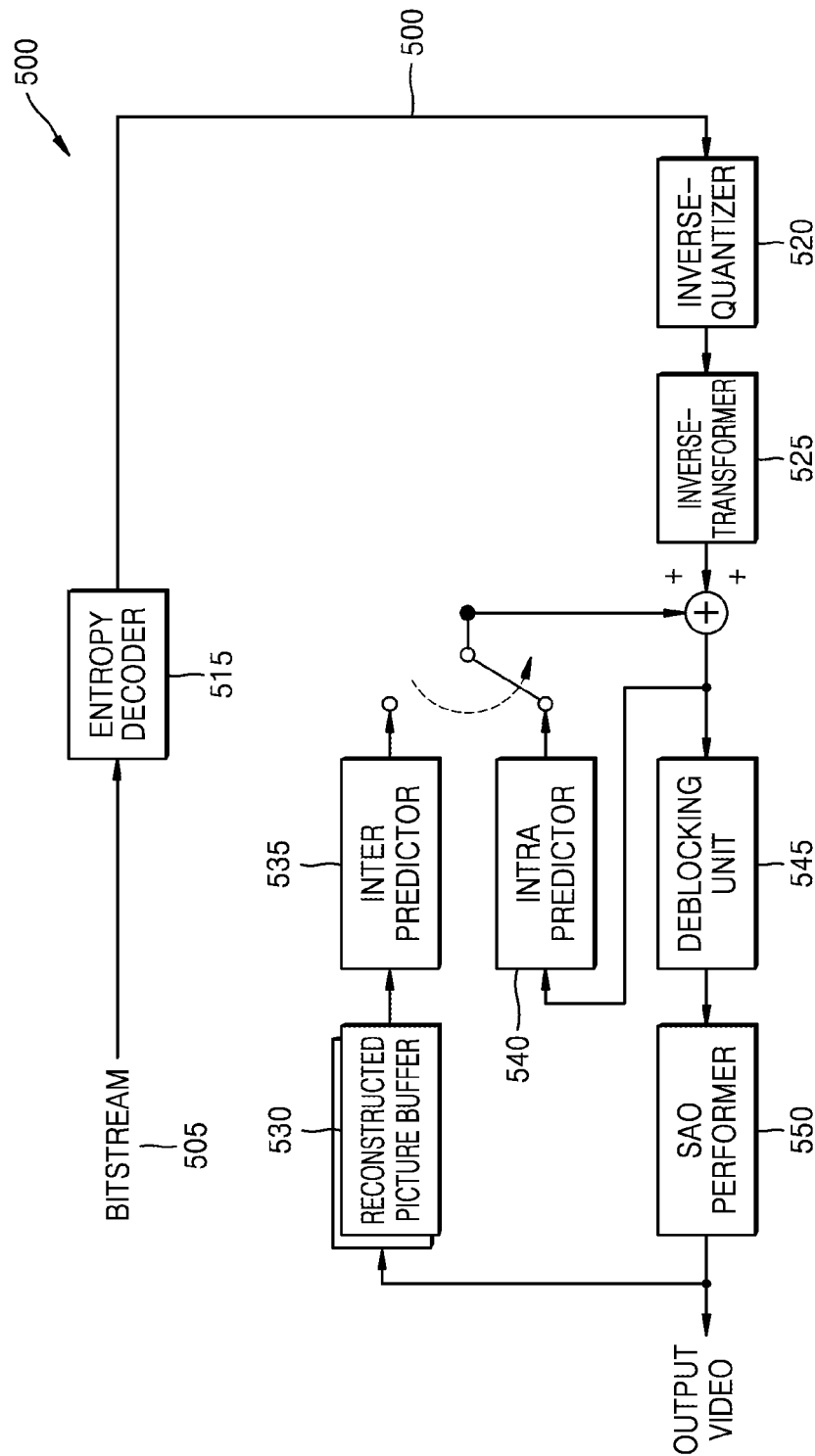
FIG. 13 illustrates a block diagram of an image decoder 500 based on coding units, according to various embodiments.

FIG. 13 illustrates a block diagram of an image decoder 500 based on coding units, according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocking unit 545 and an SAO performer 550. Reconstructed images stored in the reconstructed picture buffer 530 may be output as reference images.

In order for an image data decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to various embodiments, components of the image decoder 500, i.e., the entropy decoder 515, the inverse quantizer 520, the inverse transformer 525, the intra predictor 540, the inter predictor 535, the deblocking unit 545, and the SAO performer 550 may perform operations based on coding units having a tree structure for each largest coding unit.

In particular, the intra predictor 540 and the inter predictor 535 determine a partition mode and a prediction mode according to each of coding units having a tree structure, and the inverse transformer 525 may determine whether to split a transformation unit according to a quad-tree structure per coding unit.

For inter prediction, the inter-predictor 415 of FIG. 12 and the inter-predictor 535 of FIG. 13 may perform interpolation filtering on reference samples of an integer pixel unit of a reference picture to produce a sample value of a sub-pixel unit when a motion vector indicates a sub-pixel position. As described above with reference to FIGS. 1 to 9, either an all-pass interpolation filter capable of retaining low-frequency components and high-frequency components or an interpolation filter for passing low-frequency bands when only low-frequency components need to be retained may be selected from among interpolation filters on the basis of a degree of change between reference samples.

Figure 14:
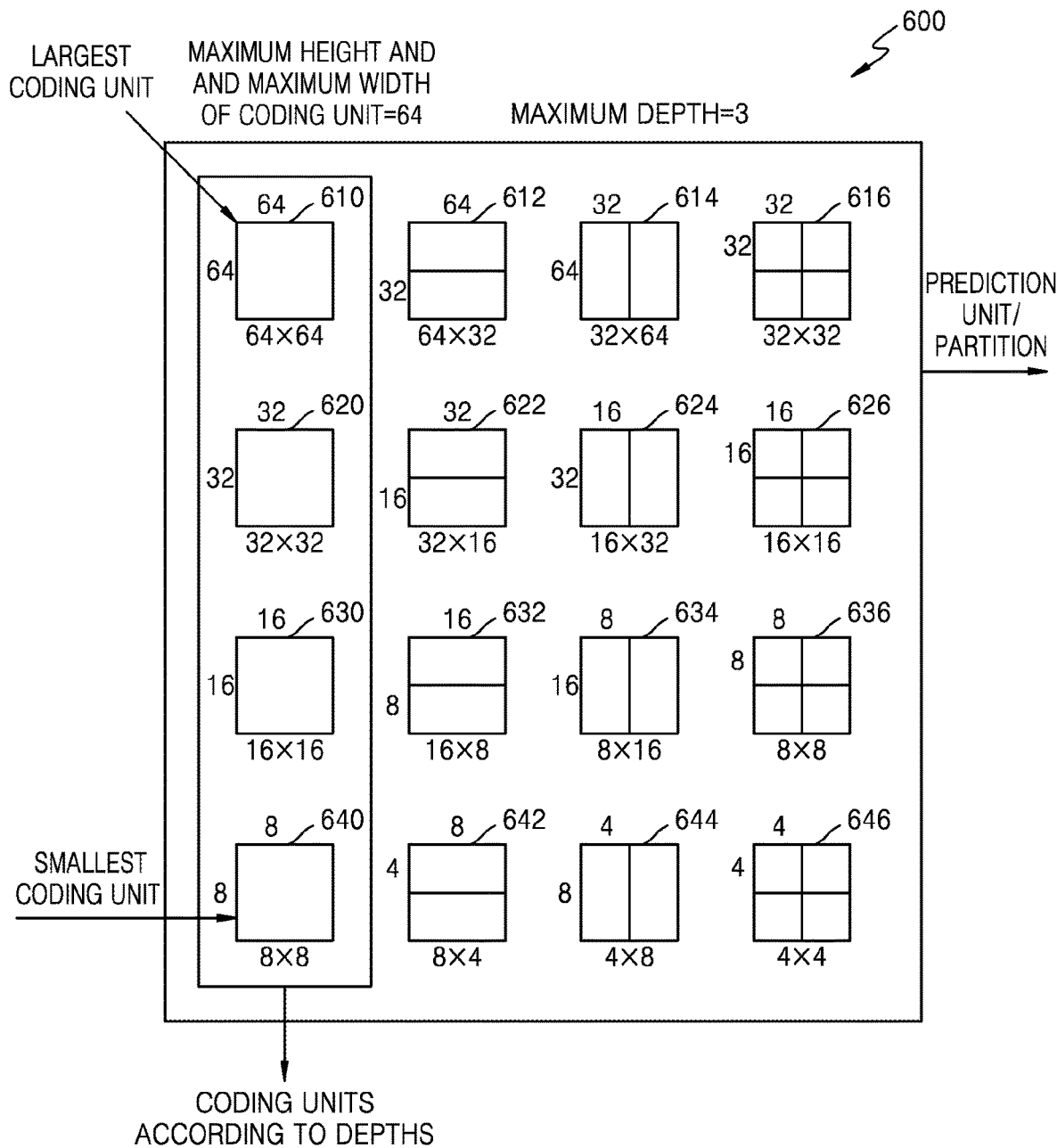
FIG. 14 illustrates coding units according to depths and partitions, according to various embodiments.

FIG. 14 illustrates coding units according to depths and partitions, according to various embodiments.

The video encoding apparatus 100 according to various embodiments and the video decoding apparatus 200 according to various embodiments use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure 600 of coding units according to various embodiments, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure 600 of coding units according to various embodiments, a height and a width of the deeper coding unit are each split. Also, a prediction unit and partitions, which are bases for prediction encoding of each deeper coding unit, are shown along a horizontal axis of the hierarchical structure 600.

That is, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having a size of 8×8 and a depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having a size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having a size of 16×16, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having a size of 8×8, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be selected for the current depth by performing encoding for each prediction unit in the coding units corresponding to the current depth, along the horizontal axis of the hierarchical structure 600. Alternatively, the minimum encoding error may be searched for by comparing the minimum encoding errors according to depths, by performing encoding for each depth as the depth deepens along the vertical axis of the hierarchical structure 600. A depth and a partition having the minimum encoding error in the largest coding unit 610 may be selected as the depth and a partition mode of the largest coding unit 610.

Figure 15:
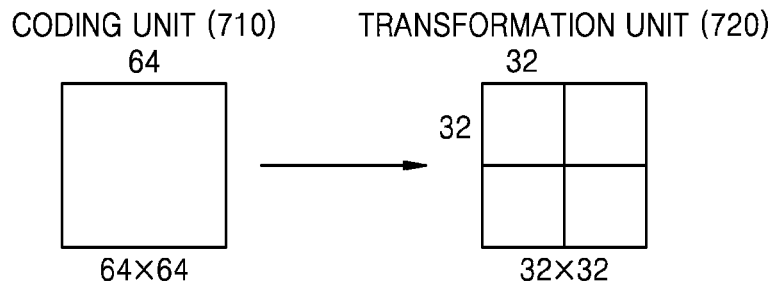
FIG. 15 illustrates a relationship between a coding unit and transformation units, according to various embodiments.

FIG. 15 illustrates a relationship between a coding unit and transformation units, according to various embodiments.

The video encoding apparatus 100 according to various embodiments or the video decoding apparatus 200 according to various embodiments encodes or decodes an image according to coding units having sizes less than or equal to a largest coding unit for each largest coding unit. Sizes of transformation units for transformation during encoding may be selected based on data units that are not larger than a corresponding coding unit.

For example, in the video encoding apparatus 100 according to various embodiments or the video decoding apparatus 200 according to various embodiments, if a size of a coding unit 710 is 64×64, transformation may be performed by using transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

Figure 16:
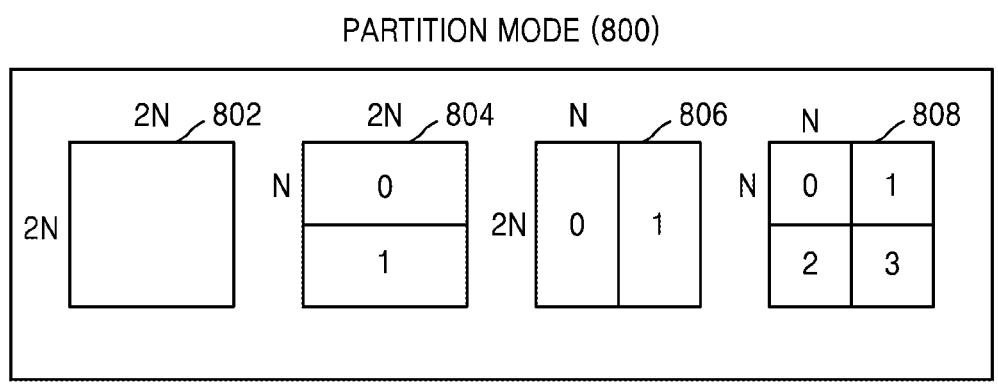
FIG. 16 illustrates a plurality of pieces of encoding information, according to various embodiments.
Figure 16:
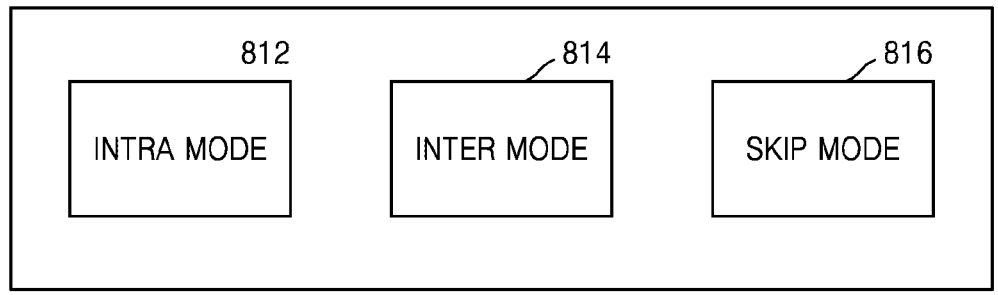
Figure 16:
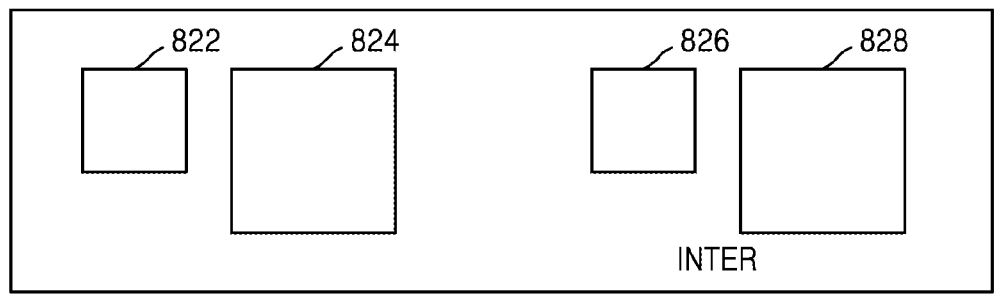

FIG. 16 illustrates a plurality of pieces of encoding information, according to various embodiments.

The output unit 130 of the video encoding apparatus 100 according to an embodiment may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the partition mode information 800, the prediction mode information 810, and the transformation unit size information 820 for decoding, according to each deeper coding unit.

Figure 17:
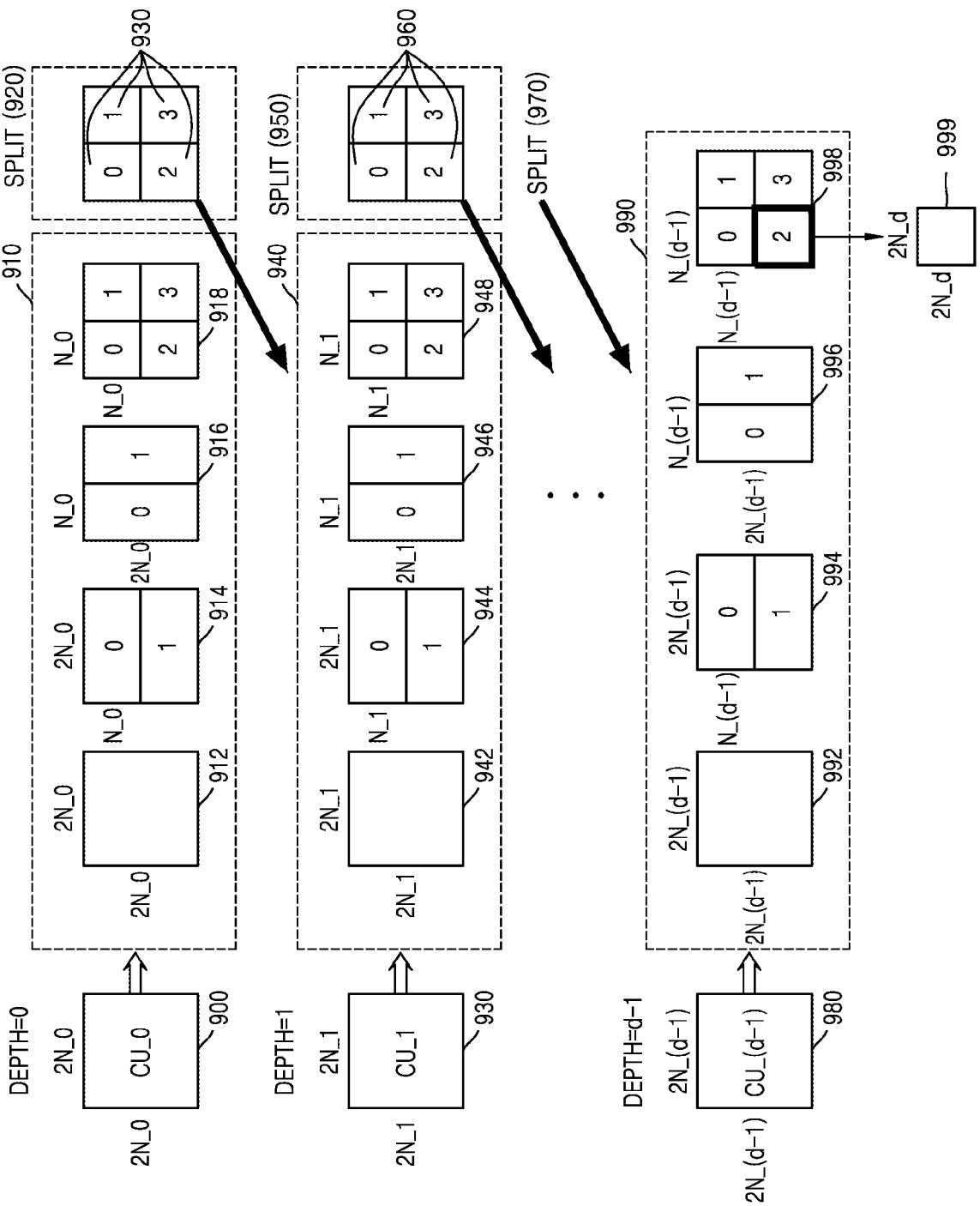
FIG. 17 illustrates deeper coding units according to depths, according to various embodiments.

FIG. 17 illustrates deeper coding units according to depths, according to various embodiments.

Split information may be used to indicate a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 of a size of N_0×N_0, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1× 2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode having a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to various embodiments may be a square data unit obtained by splitting a smallest coding unit having a lowermost depth by 4. By performing the encoding repeatedly, the video encoding apparatus 100 according to various embodiments may select a depth having the minimum encoding error by comparing encoding errors according to depths of the coding unit 900 to determine a depth, and set a corresponding partition type and a prediction mode as an encoding mode of the depth.

As such, the minimum encoding errors according to depths are compared in all of the depths of 0, 1, . . . , d−1, d, and a depth having a minimum encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to various embodiments may extract and use a depth and prediction unit information about the coding unit 900 so as to decode the coding unit 912. The video decoding apparatus 200 according to various embodiments may determine a depth, in which split information is '0', as a depth by using split information according to depths, and may use, for decoding, split information about the corresponding depth.

Figure 18:
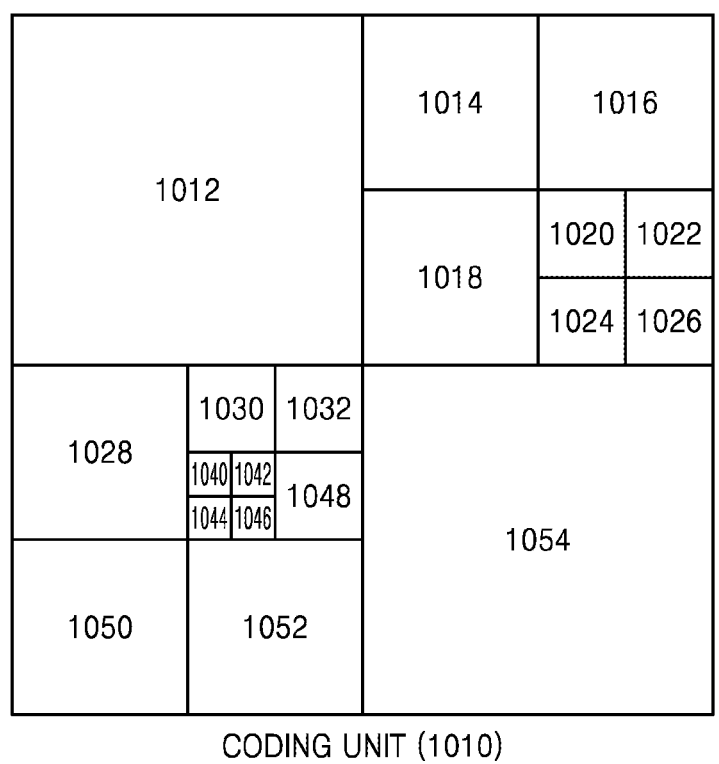
FIGS. 18, 19, and 20 illustrate a relationship between coding units, prediction units, and transformation units, according to various embodiments.
Figure 19:
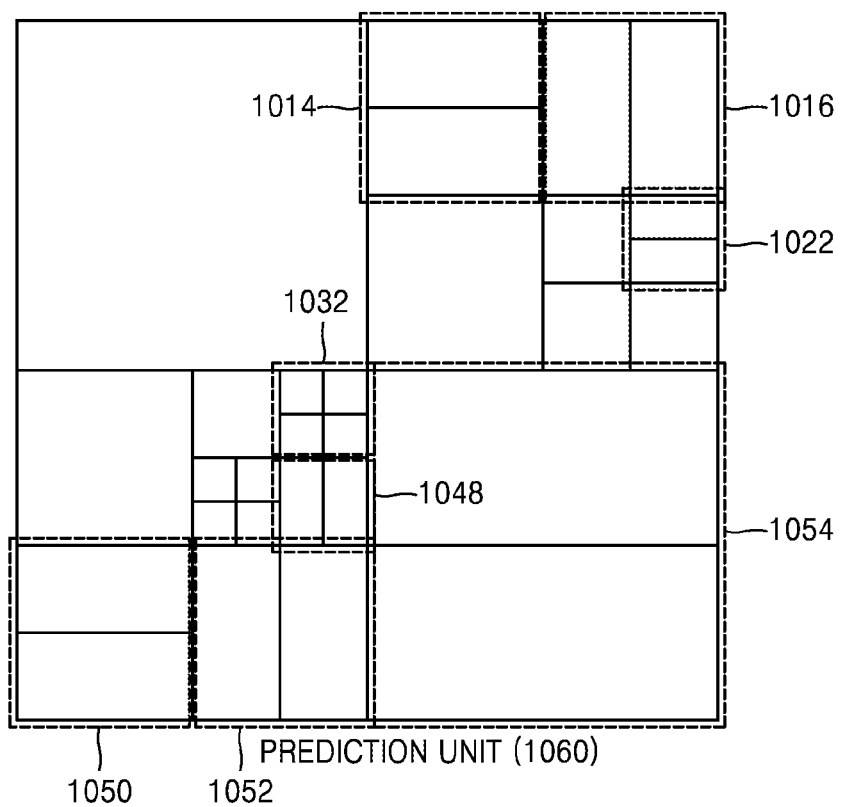
Figure 20:
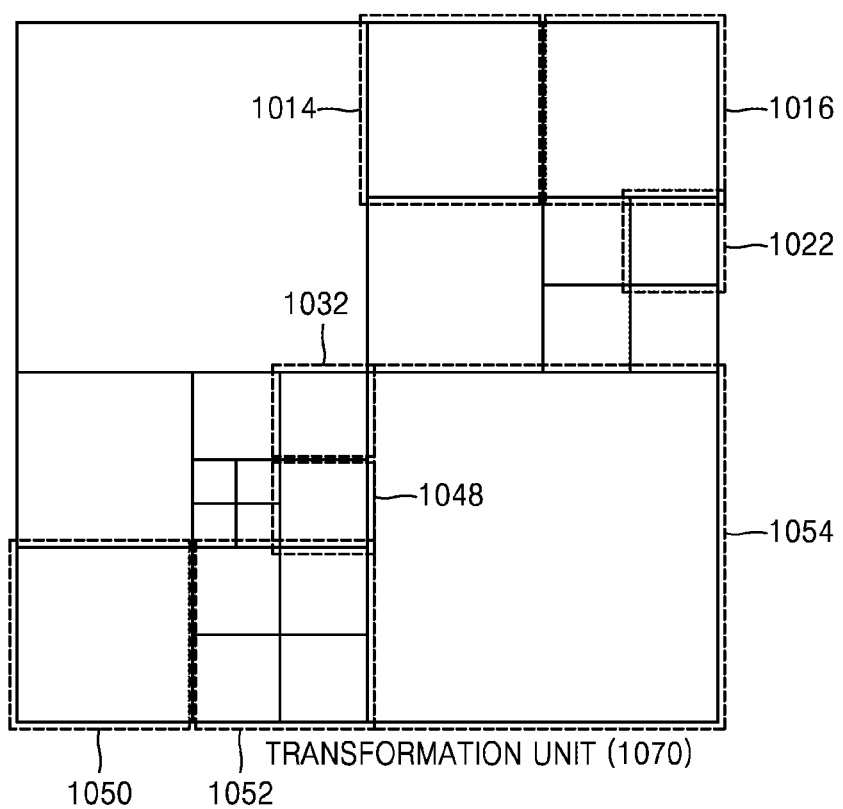

FIGS. 18, 19, and 20 illustrate a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the coding units 1010 according to depths, and transformation units 1070 are transformation units of each of the coding units according to depths.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the prediction units 1060 in terms of sizes and shapes. That is, the video encoding apparatus 100 and the video decoding apparatus 200 according to various embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 100 and the video decoding apparatus 200 according to various embodiments.

TABLE 1

Split Information 0
(Encoding on Coding Unit having Size of 2N × 2N and Current Depth of d)

| Prediction Mode | Partition Mode | | Size of Transformation Unit | | Split Information 1 |
|---|---|---|---|---|---|
| | Symmetrical Partition Mode | Asymmetrical Partition Mode | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Mode) N/2 × N/2 (Asymmetrical Partition Mode) | Repeatedly Encode Coding Units having Lower Depth of d + 1 |

The output unit 130 of the video encoding apparatus 100 according to various embodiments may output the encoding information about the coding units having a tree structure, and the image data and encoding information extractor 220 of the video decoding apparatus 200 according to various embodiments may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to various embodiments may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth, by comparing a plurality of pieces of encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 21:
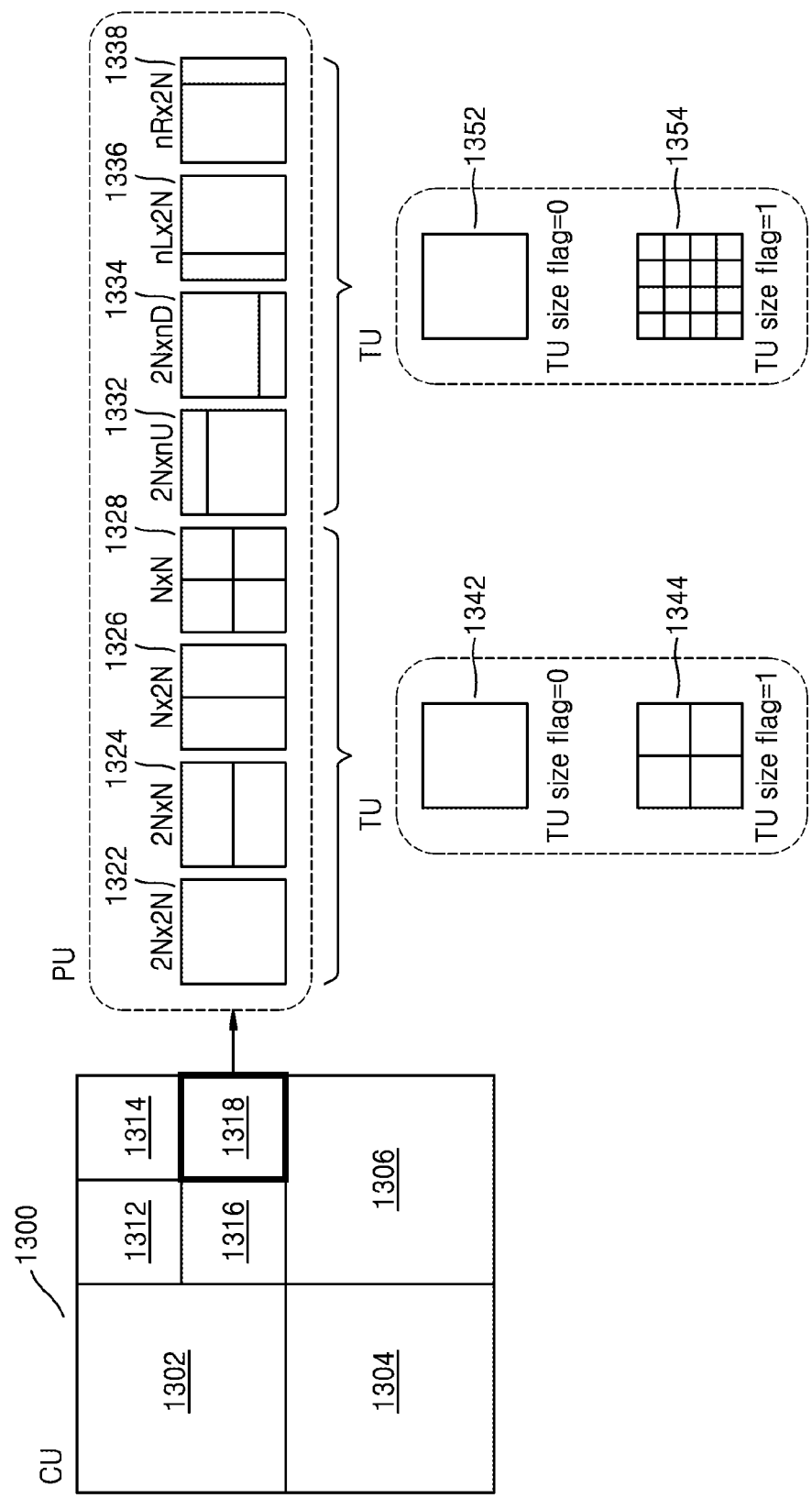
FIG. 21 illustrates a relationship between a coding unit, a prediction unit, and a transformation unit, according to encoding mode information of Table 1.

FIG. 21 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 20 is a flag having a value of 0 or 1, but the transformation unit split information according to various embodiments is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to various embodiments, together with a maximum size of the transformation unit and a minimum size of the transformation unit. The video encoding apparatus 100 according to various embodiments may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to various embodiments may decode video by using the maximum transformation unit size information, the minimum transformation unit size information, and the maximum TU size flag.

For example, (a) if the size of a current coding unit is 64×64 and a maximum transformation unit size is 32×32, (a–1) then the size of a transformation unit may be 32×32 when a TU size flag is 0, (a–2) may be 16×16 when the TU size flag is 1, and (a–3) may be 8×8 when the TU size flag is 2.

As another example, (b) if the size of the current coding unit is 32×32 and a minimum transformation unit size is 32×32, (b–1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1).

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to various embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present disclosure is not limited thereto.

According to the video encoding method based on coding units of a tree structure described above with reference to FIGS. 9 through 21, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a non-transitory computer-readable recording medium. Examples of the non-transitory computer-readable recording medium include ROM, RAM, CD-ROM, magnetic tape, floppy disk, optical data storage device, and the like. Also, the non-transitory computer-readable recording medium may be distributed on computer systems connected through a network and may be stored and executed as the computer-readable code by a distribution scheme.

While the present disclosure has been particularly shown and described with reference to embodiments thereof, it will be understood by one of ordinary skill in the art that various changes in form and details may be made therein without departing from the spirit and scope of the following claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. An image decoding method comprising:
    obtaining one or more prefixes including a first counter value indicating a count of additional syntax elements subsequent to main syntax elements from a received bitstream;
    obtaining the additional syntax elements including weight information and information about whether to perform weighted bi-prediction on prediction units separated for predicting a current block, based on the one or more prefixes; and
    generating a prediction block including a prediction value, based on the main syntax elements and the additional syntax elements,
    wherein the one or more prefixes include a second counter value indicating a count of additional syntax elements which include information indicating that the weighted bi-prediction is to be performed from among the additional syntax elements.

2. The image decoding method of claim 1, wherein each of the additional syntax elements includes a set of two bins for indicating information about the weight information and the information about whether to perform the weighted bi-prediction.

3. The image decoding method of claim 1, wherein the obtaining of the additional syntax elements comprises:
    determining probability information of bins of the additional syntax elements based on the first counter value and the second counter value; and
    sequentially decoding the bins of the additional syntax elements based on the probability information.

4. The image decoding method of claim 3, wherein the determining of the probability information comprises:
    decrementing the second counter value according to sequential decoding of the bins of the additional syntax elements; and
    updating the probability information by using the first counter value and the decremented second counter value.

5. The image decoding method of claim 1, wherein the generating of the prediction block comprises:
    determining a first correspondence region of a first reference picture and a second correspondence region of a second reference picture, which are most similar to the current block, from a first motion vector and a second motion vector included in the main syntax elements;
    confirming whether to perform the weighted bi-prediction based on the first correspondence region and the second correspondence region; and
    when it is confirmed that the bi-prediction is to be performed, performing a weighted bi-directional motion compensation of a block unit or a pixel unit on the current block by using the first motion vector, the second motion vector, and the weight information.

6. The image decoding method of claim 5, wherein the confirming of whether to perform the weighted bi-prediction comprises:
    performing no weighted bi-prediction when a difference value between a first correspondence pixel of the first reference picture and a second corresponding pixel of the second reference pixel, which correspond to each pixel of the current block, is smaller than a predetermined threshold value; and determining to perform the weighted bi-prediction when the difference value is not smaller than the predetermined threshold value.

7. An image decoding apparatus comprising:
    an obtainer configured to obtain one or more prefixes including a first counter value indicating a count of additional syntax elements subsequent to main syntax elements from a received bitstream and obtain the additional syntax elements including weight information and information about whether to perform weighted bi-prediction on prediction units separated for predicting a current block, based on the one or more prefixes; and
    a decoder configured to generate a prediction block including a prediction value, based on the main syntax elements and the additional syntax elements,
    wherein the one or more prefixes include a second counter value indicating a count of additional syntax elements which include information indicating that the weighted bi-prediction is to be performed from among the additional syntax elements.

8. The image decoding apparatus of claim 7, wherein each of the additional syntax elements includes a set of two bins for indicating information about the weight information and the information about whether to perform the weighted bi-prediction.

9. The image decoding apparatus of claim 7, wherein the additional syntax elements are obtained by determining probability information of bins of the additional syntax elements based on the first counter value and the second counter value and sequentially decoding the bins of the additional syntax elements based on the probability information.

10. The image decoding apparatus of claim 9, wherein the probability information is determined by decrementing the second counter value according to sequential decoding of the bins of the additional syntax elements and updating the probability information by using the first counter value and the decremented second counter value.

11. The image decoding apparatus of claim 7, wherein, in order to generate the prediction block, the decoder determines a first correspondence region of a first reference picture and a second correspondence region of a second reference picture, which are most similar to the current block, from a first motion vector and a second motion vector included in the main syntax elements, confirms whether to perform the weighted bi-prediction based on the first correspondence region and the second correspondence region, and performs a weighted bi-directional motion compensation of a block unit or a pixel unit on the current block by using the first motion vector, the second motion vector, and the weight information when it is confirmed that the bi-prediction is to be performed.

12. The image decoding apparatus of claim 11, wherein, in order to confirm whether to perform the weighted bi-prediction, the decoder performs no weighted bi-prediction when a difference value between a first correspondence pixel of the first reference picture and a second corresponding pixel of the second reference pixel, which correspond to each pixel of the current block, is smaller than a predetermined threshold value, and determines to perform the weighted bi-prediction when the difference value is not smaller than the predetermined threshold value.

13. An image encoding method comprising:
    determining a first motion vector and a second motion vector indicating a first correspondence region and a second correspondence region which are most similar to a current block in a first reference picture and a second reference picture;

confirming whether to perform weighted bi-prediction based on the first correspondence region and the second correspondence region;

when it is confirmed that the bi-prediction is to be performed, performing the weighted bi-prediction of a block unit or a pixel unit on the current block by using the first motion vector, the second motion vector, and a weight value; and adding additional syntax elements to an encoded bitstream, the additional syntax elements including one or more prefixes indicating a first counter value including a count of additional syntax elements and a second counter value indicating a count of additional syntax elements which include information indicating that the weighted bi-prediction is to be performed from among the additional syntax elements, weight information, and information indicating whether to perform the weighted bi-prediction on the current block.

* * * * *